(12) United States Patent
Cochran

(10) Patent No.: US 6,718,447 B2
(45) Date of Patent: Apr. 6, 2004

(54) METHOD AND SYSTEM FOR PROVIDING LOGICALLY CONSISTENT LOGICAL UNIT BACKUP SNAPSHOTS WITHIN ONE OR MORE DATA STORAGE DEVICES

(75) Inventor: Robert A. Cochran, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 367 days.

(21) Appl. No.: 09/895,474

(22) Filed: Jun. 28, 2001

(65) Prior Publication Data

US 2003/0051109 A1 Mar. 13, 2003

(51) Int. Cl.[7] ................. G06F 12/02; G06F 12/16
(52) U.S. Cl. ................. 711/162; 711/111; 714/7
(58) Field of Search .................. 711/111, 112, 161, 711/162; 714/5, 6, 7, 8, 15, 20

(56) References Cited

U.S. PATENT DOCUMENTS

| | | | | |
|---|---|---|---|---|
| 5,692,155 A | * | 11/1997 | Ishiyan et al. | 711/162 |
| 6,101,497 A | * | 8/2000 | Ofek | 707/10 |
| 6,477,591 B1 | * | 11/2002 | VanderSpek | 710/38 |
| 6,529,944 B1 | * | 3/2003 | LeCrone | 709/211 |
| 6,542,962 B2 | * | 4/2003 | Kodama et al. | 711/114 |

* cited by examiner

Primary Examiner—Gary Portka

(57) ABSTRACT

A method and system for providing logically consistent backup copies of a logical unit provided by a data storage device, and for managing and maintaining a pool of increasingly stale backup copies within the data storage device. Backup logical units within the pool are continuously recycled, so that the least recently current backup logical unit is next synchronized and activated to receive mirror I/O requests. A trigger I/O request is provided to allow an application program running on a host computer to signal points within a stream of I/O requests that represent logically consistent states.

5 Claims, 21 Drawing Sheets

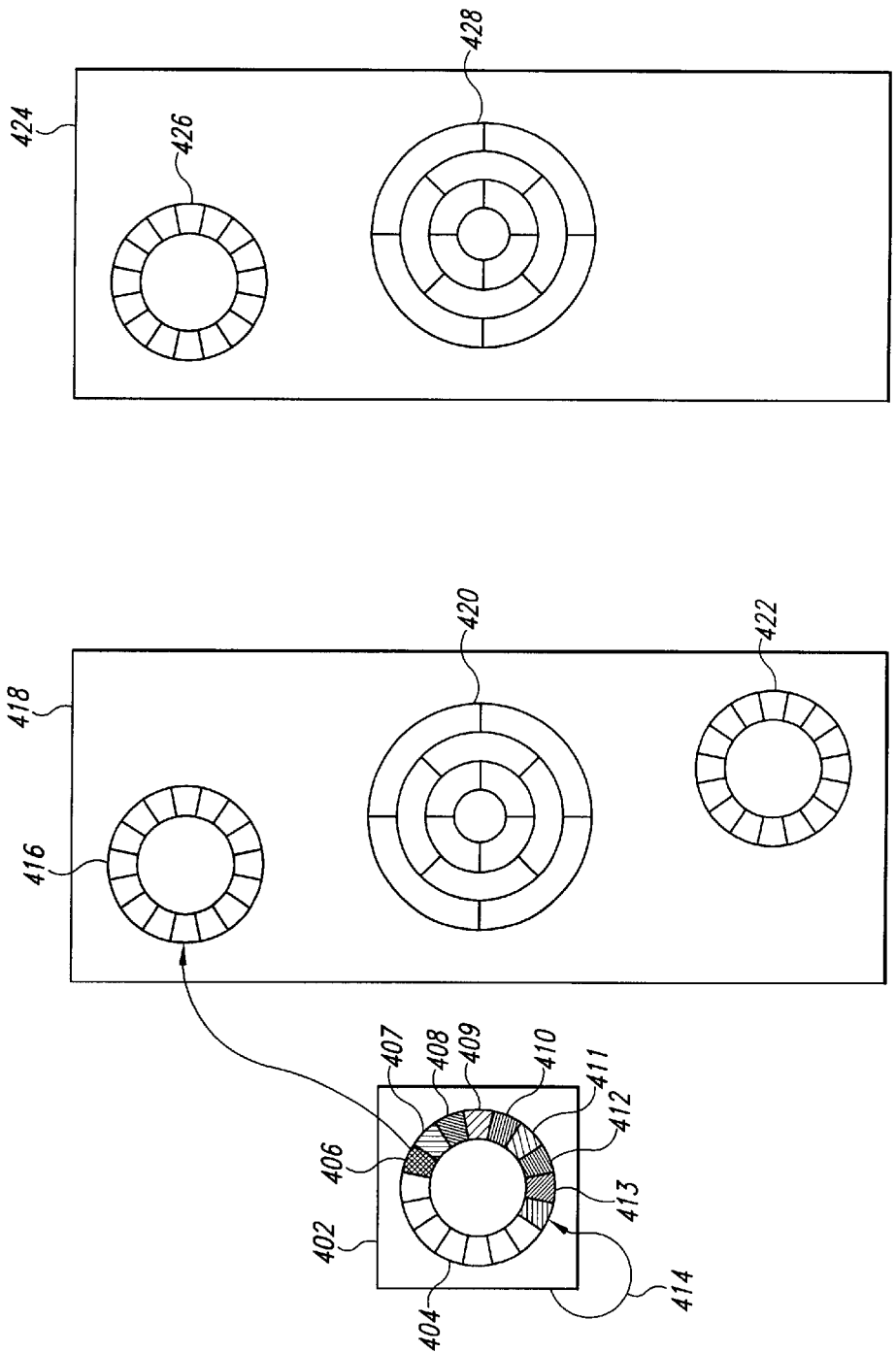

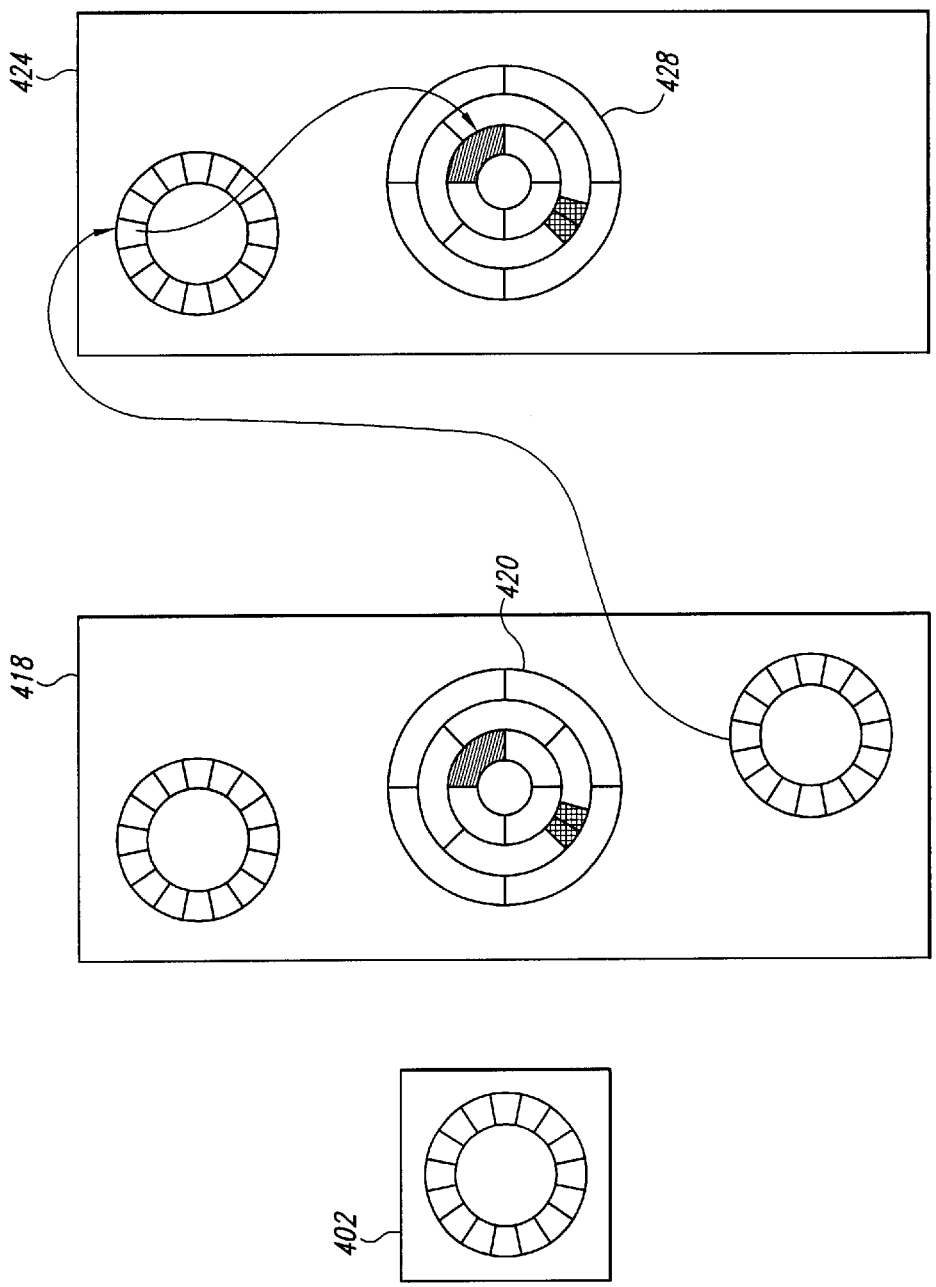

METHOD AND SYSTEM FOR PROVIDING LOGICALLY CONSISTENT LOGICAL UNIT BACKUP SNAPSHOTS WITHIN ONE OR MORE DATA STORAGE DEVICES

TECHNICAL FIELD

The present invention relates to the use of logical unit mirroring within a data storage device and, in particular, to a method and system for providing a pool of logically consistent backup logical units that lag, in data consistency, a local and/or remote primary LUN by varying periods of time.

BACKGROUND OF THE INVENTION

The present invention relates to mirror split operations conducted by the controllers of various types of data storage devices. The described embodiment relates to disk-array data-storage devices and disk-array controllers. Therefore, a concise background of disk and disk-array technologies is provided below.

FIG. 1 is a block diagram of a standard disk drive. The disk drive 101 receives I/O requests from remote computers via a communications medium 102 such as a computer bus, fibre channel, or other such electronic communications medium. For many types of storage devices, including the disk drive 101 illustrated in FIG. 1, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ request carried out by the storage device, data is returned via communications medium 102 to a remote computer, and as a result of a write request, data is received from a remote computer by the storage device via communications medium 102 and stored within the storage device.

The disk drive storage device illustrated in FIG. 1 includes controller hardware and logic 103 including electronic memory, one or more processors or processing circuits, and controller firmware, and also includes a number of disk platters 104 coated with a magnetic medium for storing electronic data. The disk drive contains many other components not shown in FIG. 1, including read/write heads, a high-speed electronic motor, a drive shaft, and other electronic, mechanical, and electromechanical components. The memory within the disk drive includes a request/reply buffer 105, which stores I/O requests received from remote computers, and an I/O queue 106 that stores internal I/O commands corresponding to the I/O requests stored within the request/reply buffer 105. Communication between remote computers and the disk drive, translation of I/O requests into internal I/O commands, and management of the I/O queue, among other things, are carried out by the disk drive I/O controller as specified by disk drive I/O controller firmware 107. Translation of internal I/O commands into electromechanical disk operations, in which data is stored onto, or retrieved from, the disk platters 104, is carried out by the disk drive I/O controller as specified by disk media read/write management firmware 108. Thus, the disk drive I/O control firmware 107 and the disk media read/write management firmware 108, along with the processors and memory that enable execution of the firmware, compose the disk drive controller.

Individual disk drives, such as the disk drive illustrated in FIG. 1, are normally connected to, and used by, a single remote computer, although it has been common to provide dual-ported disk drives for use by two remote computers and multi-port disk drives that can be accessed by numerous remote computers via a communications medium such as a fibre channel. However, the amount of electronic data that can be stored in a single disk drive is limited. In order to provide much larger-capacity electronic data-storage devices that can be efficiently accessed by numerous remote computers, disk manufacturers commonly combine many different individual disk drives, such as the disk drive illustrated in FIG. 1, into a disk array device, increasing both the storage capacity as well as increasing the capacity for parallel I/O request servicing by concurrent operation of the multiple disk drives contained within the disk array.

FIG. 2 is a simple block diagram of a disk array. The disk array 202 includes a number of disk drive devices 203, 204, and 205. In FIG. 2, for simplicity of illustration, only three individual disk drives are shown within the disk array, but disk arrays may contain many tens or hundreds of individual disk drives. A disk array contains a disk array controller 206 and cache memory 207. Generally, data retrieved from disk drives in response to READ requests may be stored within the cache memory 207 so that subsequent requests for the same data can be more quickly satisfied by reading the data from the quickly accessible cache memory rather than from the much slower electromechanical disk drives. Various elaborate mechanisms are employed to maintain, within the cache memory 207, data that has the greatest chance of being subsequently re-requested within a reasonable amount of time. The data contained in WRITE requests may also be stored first in cache memory 207, in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes to tens or hundreds of terabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass storage devices other than hard disks, or combinations of memory, hard disks, and/or other types of mass storage devices. Remote computers generally access data within a disk array through one of the many abstract LUNs 208–215 provided by the disk array via internal disk drives 203–205 and the disk array controller 206. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

In many computer applications and systems that need to reliably store and retrieve data from a mass storage device, such as a disk array, a primary data object, such as a file or database, is normally backed up to backup copies of the primary data object on physically discrete mass storage devices or media so that if, during operation of the application or system, the primary data object becomes corrupted, inaccessible, or is overwritten or deleted, the primary data object can be restored by copying a backup copy of the primary data object from the mass storage device. Many different techniques and methodologies for maintaining backup copies have been developed. In one well-known technique, a primary data object is mirrored. FIG. 3 illustrates object-level mirroring. In FIG. 3, a primary data object "$O_3$" 301 is stored on LUN A 302. The mirror object, or backup copy, "$O_3$" 303 is stored on LUN B 304. The arrows in FIG. 3, such as arrow 305, indicate I/O write requests directed to various objects stored on a LUN. I/O WRITE requests directed to object "$O_3$" are represented by arrow 306. When object-level mirroring is enabled, the disk array controller providing LUNs A and B automatically generates a second I/O write request from each I/O write request 306 directed to LUN A, and directs the second generated I/O write request via path 307, switch "$S_1$" 308, and path 309 to the mirror object "$O_3$" 303 stored on LUN B 304. In FIG. 3, enablement of mirroring is logically represented by switch "$S_1$" 308 being on. Thus, when object-level mirroring is enabled, any I/O write request, or any other type of I/O request that changes the representation of object "$O_3$" 301 on LUN A, is automatically mirrored by the disk array controller to identically change the mirror object "$O_3$" 303. Mirroring can be disabled, represented in FIG. 3 by switch "$S_1$" 308 being in an off position. In that case, changes to the primary data object "$O_3$" 301 are no longer automatically reflected in the mirror object "$O_3$" 303. Thus, at the point that mirroring is disabled, the stored representation, or state, of the primary data object "$O_3$" 301 may diverge from the stored representation, or state, of the mirror object "$O_3$" 303. Once the primary and mirror copies of an object have diverged, the two copies can be brought back to identical representations, or states, by a resync operation represented in FIG. 3 by switch "$S_2$" 310 being in an on position. In the normal mirroring operation, switch "$S_2$" 310 is in the off position. During the resync operation, any I/O operations that occurred after mirroring was disabled are logically issued by the disk array controller to the mirror copy of the object via path 311, switch "$S_2$," and pass 309. During resync, switch "$S_1$" is in the off position. Once the resync operation is complete, logical switch "$S_2$" is disabled and logical switch "$S_1$" 308 can be turned on in order to reenable mirroring so that subsequent I/O write requests or other I/O operations that change the storage state of primary data object "$O_3$," are automatically reflected to the mirror object "$O_3$" 303.

In many data storage devices, including disk arrays, mirroring is conducted by a disk array controller on a per-LUN basis. A LUN may be mirrored for various reasons, including for preparation of a backup copy of a primary LUN that can be used for database backup and for archival purposes. For these purposes, a LUN may be mirrored for some interval of time, and the mirroring may then be disabled, or, in other words, the mirrored LUN pair may then be split, so that the backup LUN of a the primary-LUN/backup-LUN mirror pair can be used as a consistent snapshot of the data state of the primary LUN at the point in time that mirroring is disabled. Thus, the mirroring capability built into disk array controllers and controllers of other types of data storage devices can be exploited as an efficient data backup mechanism by database management systems and other application programs.

Unfortunately, there are a number of significant deficiencies in using data-storage-device-based mirroring for generating backup copies of primary LUNs by application programs and system routines running on a host computer. First, data storage devices cannot determine when a primary LUN or a backup LUN of a mirrored LUN pair is in a logically consistent state with respect to host-computer transaction processing, database management, or other such activities involving data maintenance. Logically consistent states may occur quite infrequently, and, therefore, a backup LUN generated by a mirror split operation is generally logically inconsistent. In some cases, the backup LUN can be repaired by backing out incomplete transactions, for example, to produce a logically consistent backup, but, in other cases, the backup LUN cannot be repaired. Another deficiency in using data-storage-device-based mirroring for generating backup copies is the overhead involved, from the perspective of an application program, in regularly directing splitting of a mirrored LUN pair, including overhead involved in managing backup LUNs and the overhead of sometimes lengthy unavailability of a primary LUN during the mirror split operation. For these reasons, designers and manufacturers of data storage devices, and developers of application programs and database management systems have recognized the need for a more convenient and efficient method for employing data-storage-device mirroring to generate backup LUNs for database backup, archival purposes, and for other purposes.

SUMMARY OF THE INVENTION

In one embodiment of the present invention, the controller of a data storage device recognizes a special I/O request received from a host computer as a TRIGGER event, and inserts a corresponding TRIGGER message into a sequenced stream of I/O requests for a particular primary LUN of a primary LUN/backup LUN mirror pair. The TRIGGER message indicates to the data storage device controller that, when all I/O requests preceding the TRIGGER message are successfully executed on the primary LUN, the primary LUN will be in a logically consistent state. The TRIGGER message can be, in turn, inserted into the I/O request stream directed to the backup LUN, so that the backup LUN can also detect a logically consistent state. In the described embodiment, a mirror split occurs at a point in time that both the primary LUN and backup LUN of a mirrored LUN pair are logically consistent, and the data states of the primary LUN and backup LUN are consistent. In the described embodiment, a pool of circularly linked backup LUNs is managed by a data storage device controller. Generally, one backup LUN of the pool of circularly linked backup LUNs is active, and actively receives mirror WRITE requests, and the other backup LUNs of the pool of circularly linked backup LUNs are inactive. The backup LUNs are rotated through the active state at regular intervals, so that the backup LUNs represent successively less recent, logically consistent snapshots of the primary LUN. An application program or system routine running on a host computer can thus easily use the mirroring functionality provided by the data storage device to generate backup copies of a primary LUN.

BRIEF DESCRIPTION OF THE DRAWINGS

FIGS. 4A–I illustrate problems that prevent logically consistent and quick mirror split operations.

DETAILED DESCRIPTION OF THE INVENTION

Figure 1:
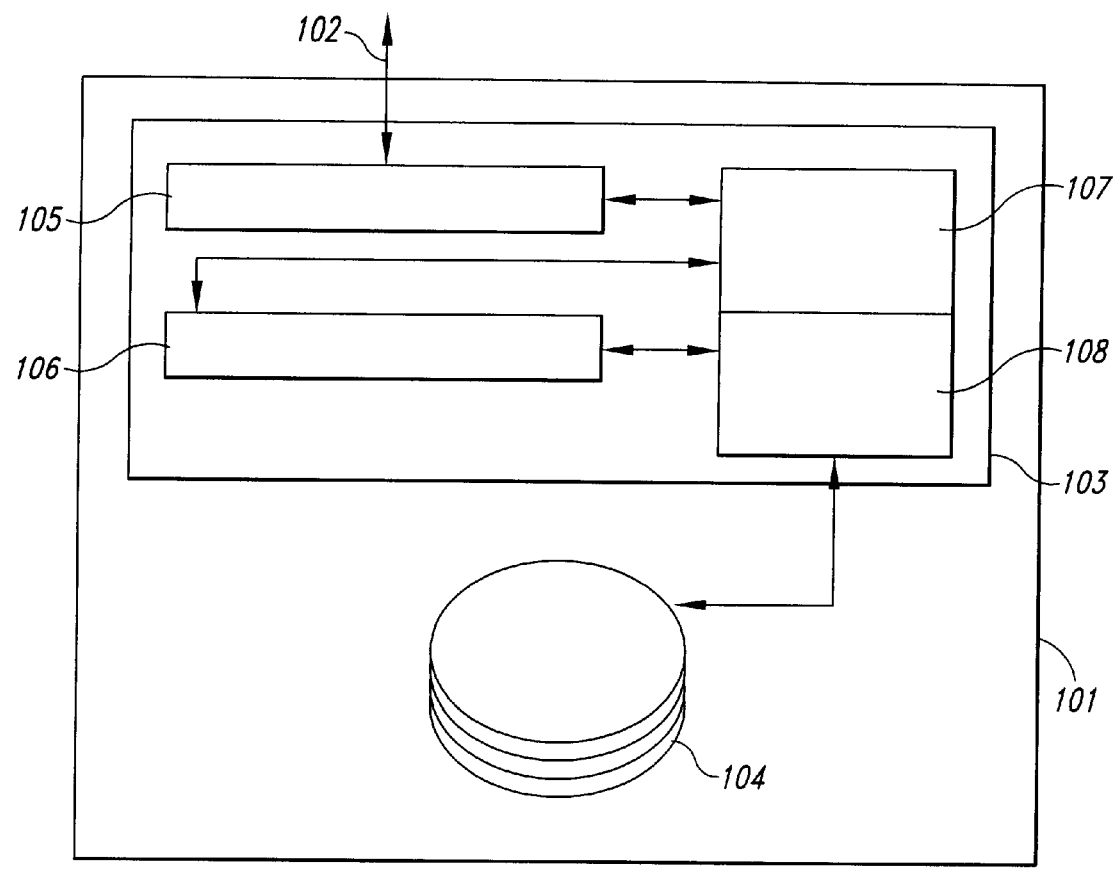
FIG. 1 is a block diagram of a standard disk drive.
Figure 2:
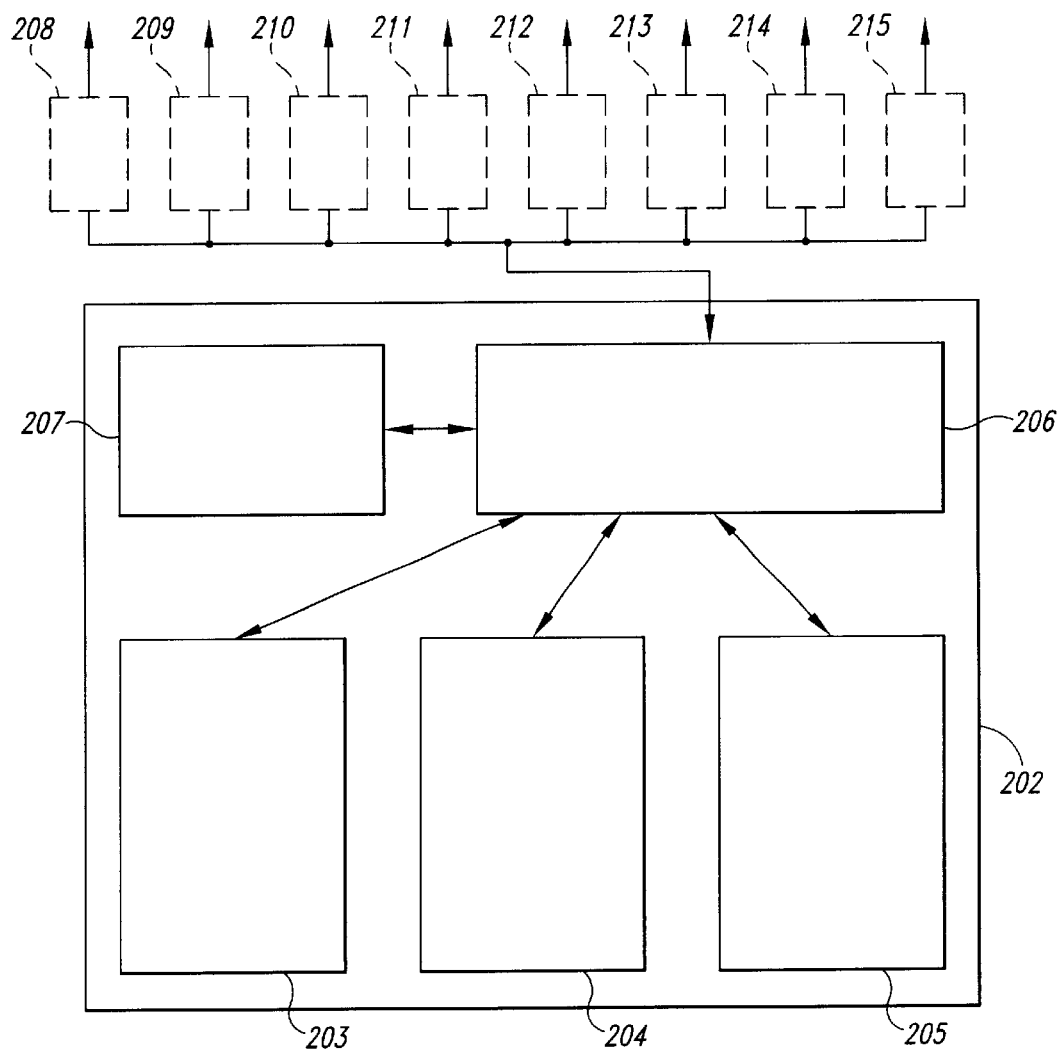
FIG. 2 is a simple block diagram of a disk array.
Figure 3:
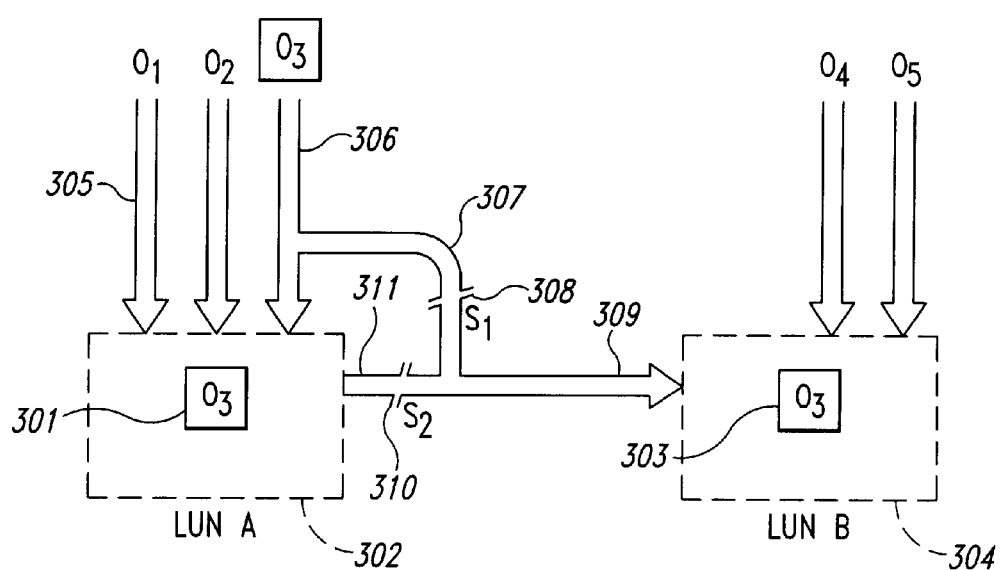
FIG. 3 illustrates object-level mirroring.

Embodiments of the present invention incorporate a TRIGGER event technique that allows an application program or system routine running on a host computer to identify, to the controller of a data storage device, points in a stream of I/O requests directed to a primary LUN that represent logically consistent data states when all preceding I/O requests in the stream of I/O requests have been successfully executed. These embodiments also employ pools of backup LUNs managed by the data-storage-device controller. In order to describe the TRIGGER technique and the backup-LUN-pool technique, the problems of backup-LUN synchronization and logical consistency need further description.

FIGS. 4A–I illustrate problems that prevent logically consistent and quick mirror split operations. In FIGS. 4A–I, a simplified, abstract view of mirror-related I/O request handling is provided. The view is simplified because only a single mirrored LUN pair is discussed, although a disk array controller needs to concurrently handle processing of I/O requests directed to from tens to thousands of mirrored LUN pairs. Furthermore, many details of disk arrays unnecessary for explaining backup-LUN synchronization and logical consistency problems are omitted. Nevertheless, the problems illustrated in FIGS. 4A–I are representative of the many concurrently overlapping problems experienced by a disk array controller.

FIGS. 4A–I employ similar illustrative conventions. These conventions are described with reference to FIG. 4A, and many of the numerical labels introduced in FIG. 4A will be used in FIGS. 4A–I, as well as in FIGS. 5A–D, discussed below. In Figure A, an application program running on a host computer 402 generates I/O requests and adds them to an output queue 404 for transmission, via a communications medium, to a disk array 418. There are a number of WRITE requests already queued to the output queue 404, including WRITE requests 406, 408, and 412 associated with a first transaction, darkly colored in FIG. 4A to indicate the association with the first transaction, WRITE requests 407 and 411 associated with a second transaction, cross-hatched in FIG. 4A to indicate the association with the second transaction, and additional WRITE requests 409, 410, 413, and 414 not explicitly associated with a transaction described in the current example. The WRITE requests 406–414 are directed to a primary LUN 420 in the disk array 418. The primary LUN is mirrored to a backup LUN 428 in a second disk array 424. A WRITE request from output queue 404 thus is transmitted first to the first disk array 418, queued to the input queue 416 of the first disk array 418. The controller of the first disk array 418 dequeues WRITE requests from the input queue 416, executes the WRITE requests on the primary LUN 420 to write data to the primary LUN, and queues mirror WRITE requests to output queue 422 for transmission to the input queue 426 of the second disk array 424 for writing to the backup LUN 428. Note that, in the current example, only WRITE requests are discussed, because, in general, WRITE requests represent the vast majority of I/O requests that alter the data state of a LUN.

Figure 4B:
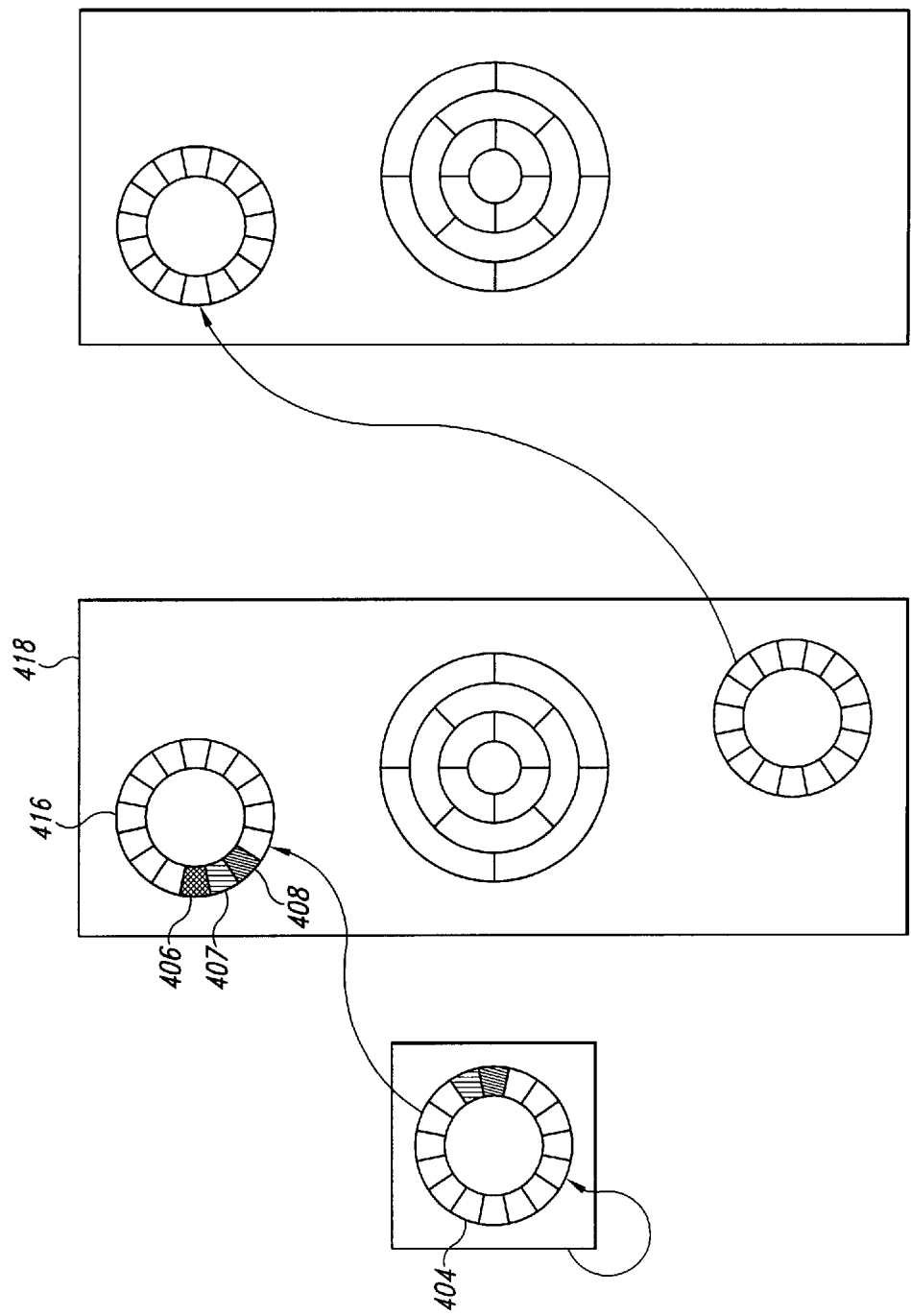

FIG. 4A thus represents an initial set of conditions for a two-transaction example that is provided with reference to FIGS. 4B–4I. Initially, it is assumed that primary LUN 420 and backup LUN 428 contain the same data, and are thus in a data-consistent state. They are also assumed to be logically consistent, or, in other words, do not contain partial data associated with one or more host-application transactions.

Figure 4C:
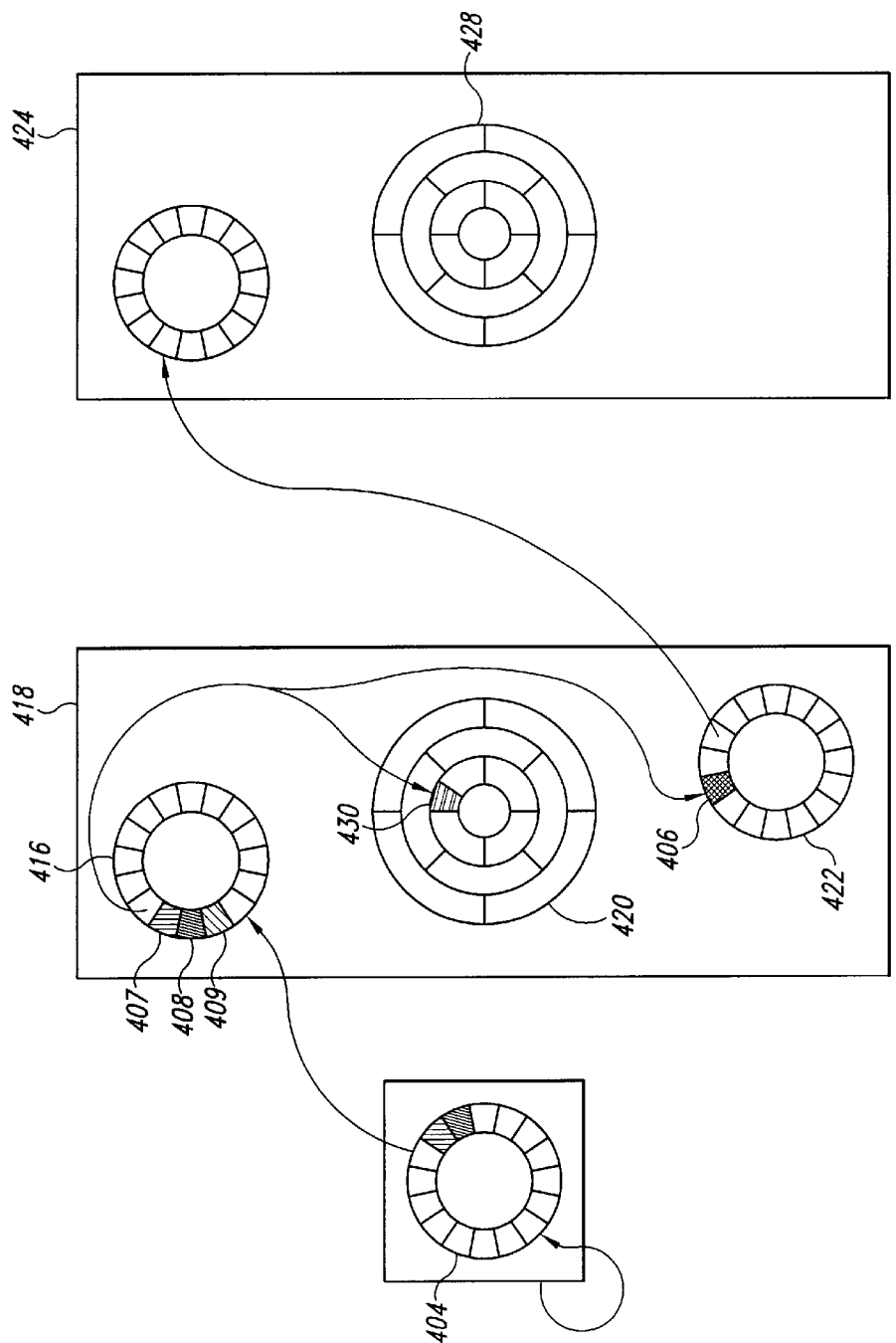

In FIG. 4B, WRITE requests 406–408 have been transmitted from output queue 404 through a communications medium to input queue 416 of the first disk array 418. In FIG. 4C, WRITE request 409 has joined WRITE requests 408 and 407 on the input queue 416 of the first disk array 418, and WRITE request 406 has been executed on the primary LUN 420, resulting in data 430 written to primary LUN 420. In addition, WRITE request 406 has been placed onto the output queue 422 of the first disk array 418 for transmission to the second disk array 424. Thus, WRITE request 406 is queued as a mirror WRITE request directed to backup LUN 428.

Figure 4D:
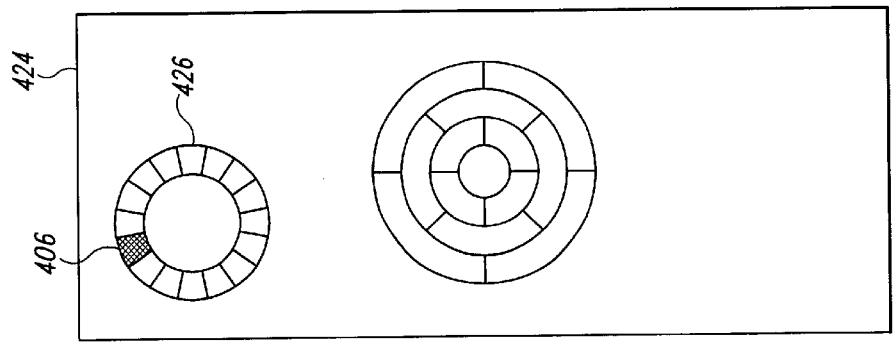
Figure 4D:
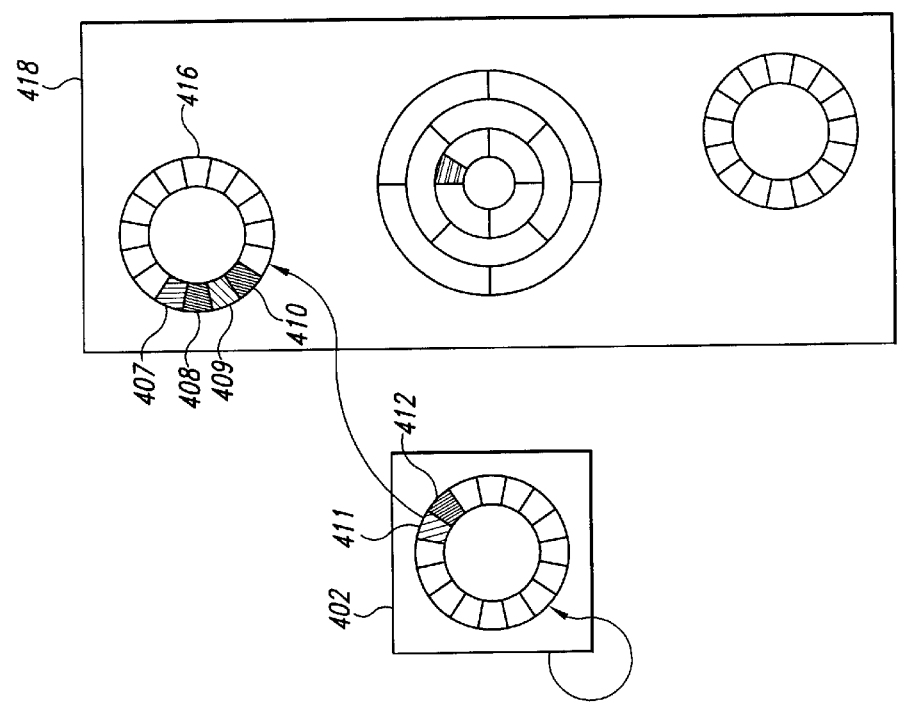
Figure 4E:
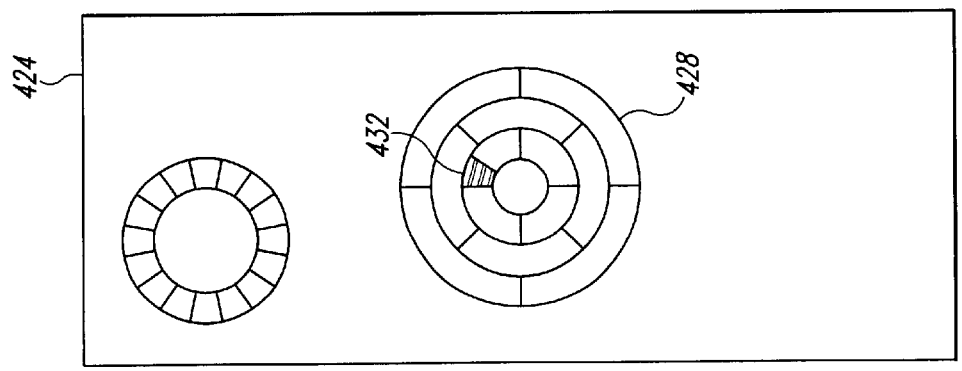
Figure 4E:
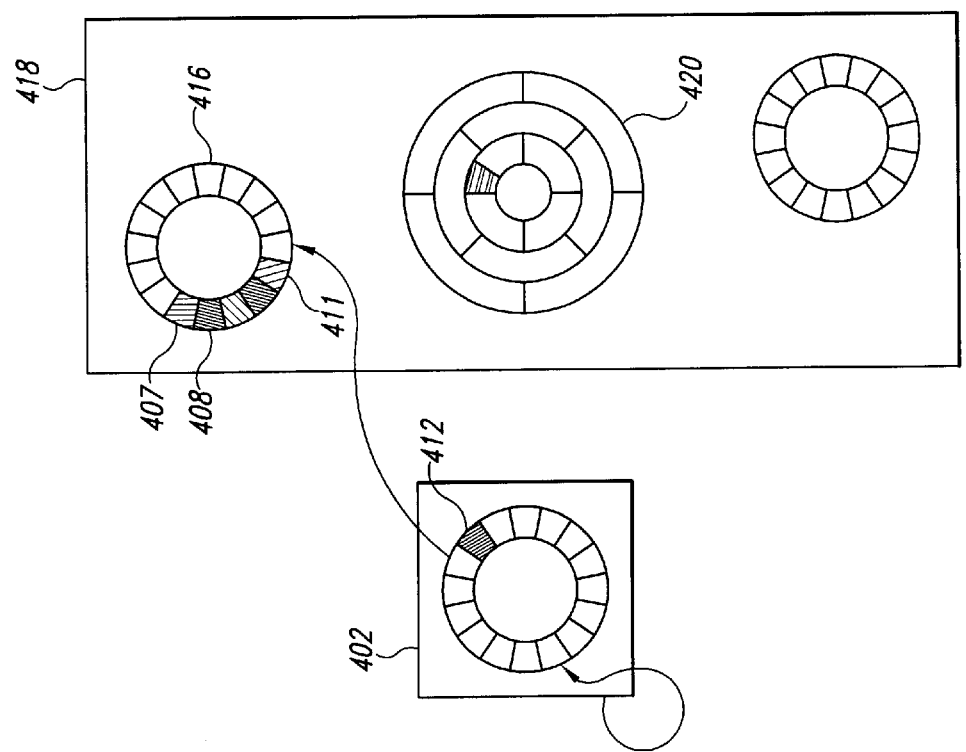

In FIG. 4D, WRITE request 406 has been transmitted via the communications medium to the input queue 426 of the second disk array 424, but, due to bottlenecks in communications between the host computer 402 and the first disk array 418, or because of other higher-priority intervening tasks requiring the host computer's processing cycles, no further WRITE requests have been transmitted from the host computer 402 to the input queue 416 of the first disk array 418. In FIG. 4E, WRITE request 406 has been executed to the backup LUN 428 resulting in data 432 written to the backup LUN 428. Processing of WRITE requests from the input queue 416 by the controller of the first disk array 418 is temporarily stalled, although an additional WRITE request 411 has been transferred from the host computer to input queue 416. At the point in time represented by FIG. 4E, the data state of the primary LUN 420 is consistent with the data state of the backup LUN 428. All WRITE requests executed on the primary LUN 420 have also been executed on the backup LUN 428. This data-state consistency can be determined by the disk array controllers of disk arrays 418 and 424, and such data-consistent states are normally selected by data storage device controllers for mirror splitting.

With respect to the first and second transactions carried out by the host computer 402 involving WRITE requests 406, 408, and 412 and WRITE requests 407 and 411, respectively, the data state of both the primary LUN 420 and backup LUN 428 are not logically consistent, in FIG. 4E. For logical, transaction-based consistency, all WRITE requests associated with multiple-WRITE-request transactions need to be either fully executed on a LUN or not executed on the LUN. However, at the point in time shown in FIG. 4E, WRITE request 406 has been executed to primary LUN 420 and backup LUN 428, but related WRITE requests 408 and 412 have not been executed to either the primary LUN or backup LUN. Should disk array 418 fail, at this point in time, primary LUN 420 will be left in a logically inconsistent state, containing only partial data for the first transaction, and backup LUN 428 will also be in a logically inconsistent state, and will not be useable for backup purposes until all partially completed transactions, such as data 432 written to the backup LUN 428, are recognized and removed. In certain cases, partially executed transactions can be identified and removed in order to produce a logically consistent backup. In other cases, the task is impossible.

As illustrated in FIGS. 4A–E, the problem of logical inconsistency of primary and backup LUNs results from the inability of a data storage device controller to recognize transaction boundaries within a stream of WRITE requests. Only the application program, system routine, or other host-computer-resident process issuing WRITE requests has sufficient information to recognize points in a stream of WRITE requests that represent clean transaction boundaries with respect to all ongoing transactions that correspond to points of logical consistency. Note that a LUN may be logically inconsistent with respect to one transaction, or with respect to multiple concurrent host-application transactions. As the number of transactions with respect to which a LUN is logically inconsistent grows, the task of repairing the logical inconsistency in case of a failure may increase greatly in complexity.

FIGS. 4A–I illustrate another problem associated with using data-storage-device mirroring to generate backup copies of a primary LUN. Although few WRITE requests are shown queued to output queue 422 and input queue 426 of the first and second disk arrays, respectively, there may be megabytes of WRITE request data backed up on queues. When the disk-array controller of the first disk array 418 receives a mirror split request, the disk-array controller and the disk-array controller of the second disk array 424 need to cooperatively flush all such queued WRITE requests and execute them on the backup LUN 428 in order to bring the backup LUN 428 to a data consistent point. Moreover, when a new backup LUN is paired with the primary LUN to reconstitute a mirrored LUN pair, the data state of the new backup LUN must be brought to consistency with that of the primary LUN in a synchronization process. Thus, a mirror split operation may take considerable time, and the primary LUN may be unavailable for additional WRITE request execution until the mirror split operation completes.

Figure 4F:
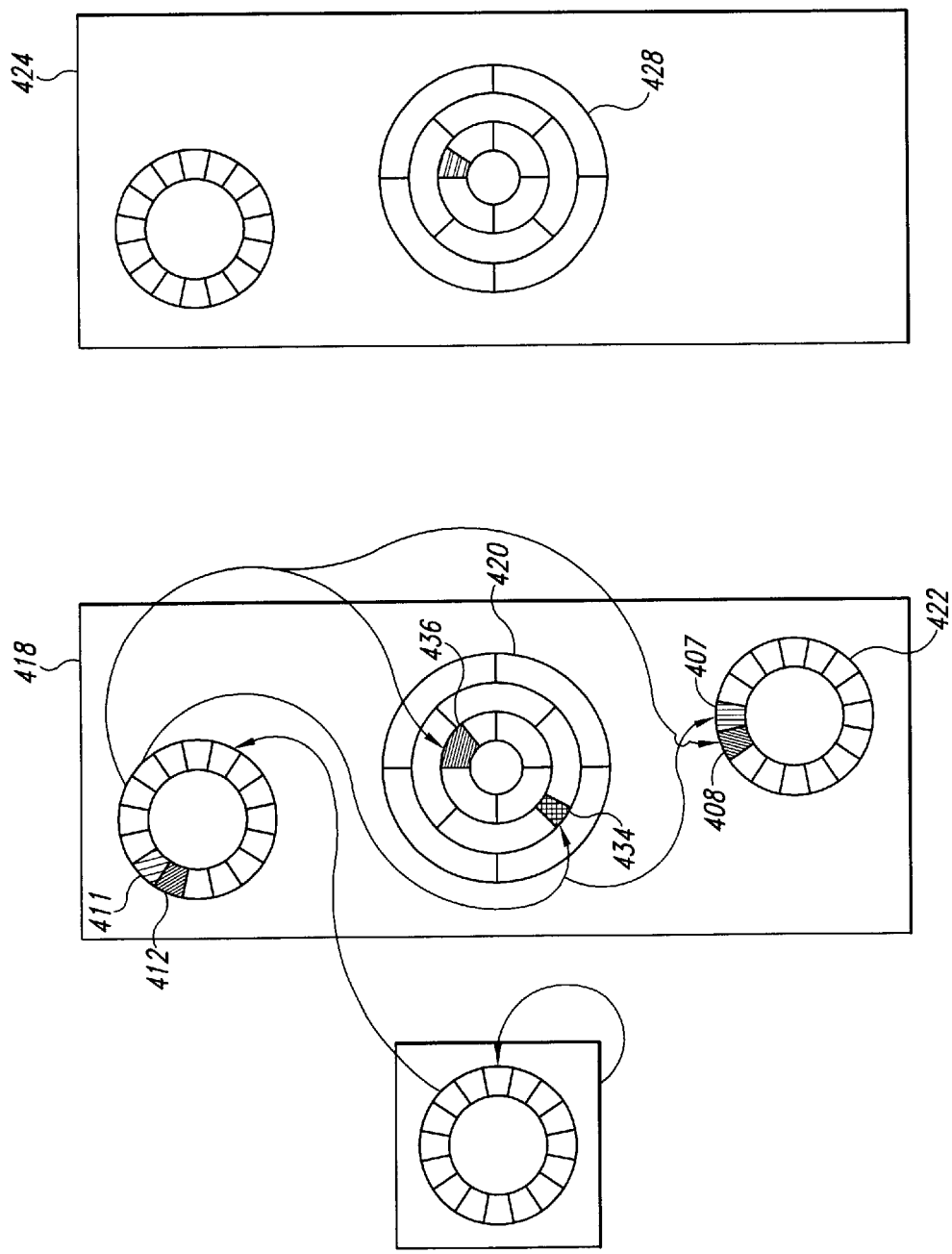

In FIG. 4F, processing of WRITE requests by the controller of the first disk array 418 has resumed, and WRITE requests 407 and 408 have been executed on primary LUN 420, resulting in data 434 and 436 written to primary LUN 420. WRITE requests 407 and 408 have been placed on the output queue 422 of the first disk array 418 for forwarding, as mirror WRITE requests, to the second disk array 424. WRITE requests 411 and 412 have been successfully transmitted to the first disk array 418 through a communications medium. At the point in time shown in FIG. 4F, the data state of the primary LUN 420 is no longer consistent with the data state of the backup LUN 428, and the data state of the primary LUN 420 is now logically inconsistent with respect to both the first transaction and the second transaction, whereas the data state of the backup LUN 428 is logically inconsistent only with respect to the first transaction.

Figure 4G:
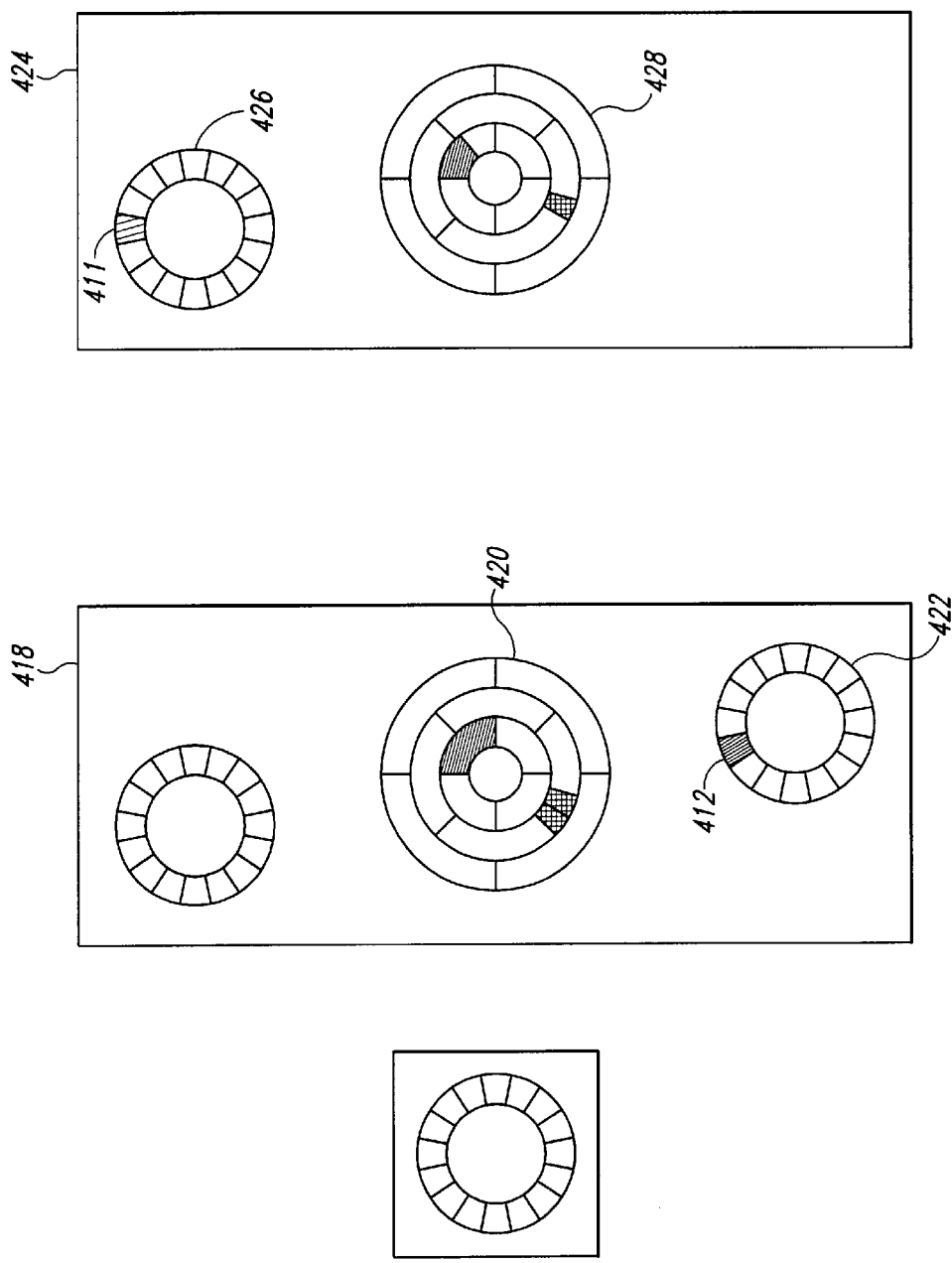

In FIG. 4G, all WRITE requests related to the first and second transactions have been executed on the primary LUN 420, which is now in a logically consistent state. WRITE request 412 has been placed on output queue 422 of the first disk array 418 for transmission as a mirror WRITE request to the second disk array 424. WRITE request 411 resides on the input queue 426 of the second disk array 424. The backup LUN 428 contains data associated with WRITE requests 406, 408, and 407, and is therefore logically inconsistent with respect to both the first and second transactions. Note that the data state of the primary LUN 420 is inconsistent with the data of the backup LUN 428. Thus, were the first disk array 418 to fail, the backup LUN 428 would need to be cleansed of data associated with WRITE requests 406–408 in order to be placed in a logically consistent state prior to being used as the primary LUN following fail over.

Figure 4H:
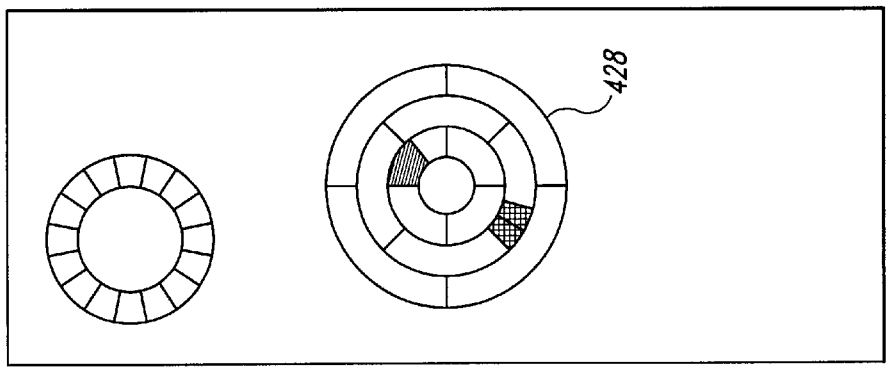
Figure 4H:
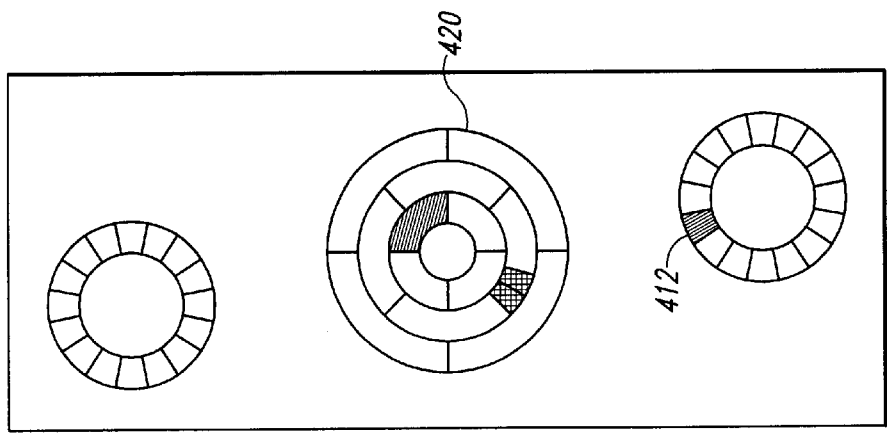
Figure 4H:
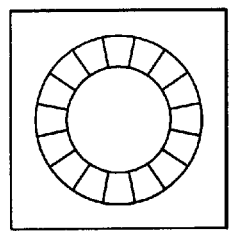

In FIG. 4H, WRITE request 411 has been executed on the backup LUN 428, which is now logically consistent with respect to the second transaction, but logically inconsistent with respect to the first transaction. WRITE request 412 has yet to be mirrored to the backup LUN 428. As before, the primary LUN 420 is logically consistent with respect to both the first and second transactions. The situation in FIG. 4H demonstrates that a LUN may be logically consistent with respect to one transaction, but logically inconsistent with respect to others. Finally, in FIG. 4I, all WRITE requests associated with the first and second transactions are fully executed on both the primary LUN 420 and the backup LUN 428. At the point in time shown in FIG. 4I, the data states of the primary LUN and backup LUN are consistent, and both are logically consistent, at least with respect to transactions emanating from host computer 402. Thus, either the point in time shown in FIG. 4A or the point in time shown in FIG. 4I would be appropriate points in time for disabling mirroring in order that backup LUN 428 become an inactive, archival backup LUN. The intervening points in time illustrated in FIGS. 4C–4H would not be appropriate points in time for generating a backup copy of the primary LUN. However, as discussed above, the controllers of the first disk array 418 and second disk array 424 have no way of determining those points in time at which the primary LUN and backup LUN are in a logically consistent state. They can only determine points in time when the data states of the primary LUN and backup LUN are consistent with one another, such as the points in time shown in FIGS. 4A, 4B, 4E, and 4I.

The present invention addresses the logical consistency problem illustrated in FIGS. 4A–I by introducing a special trigger message. The trigger message, from the standpoint of the host computer, is an I/O request directed to either a special LUN or volume of the first disk array, or an I/O request directed to the primary LUN of a mirrored LUN pair by an alternate path designated as the path for trigger messages, or some other kind of out-of-band signal sent from the host computer to the disk array.

Figure 5A:
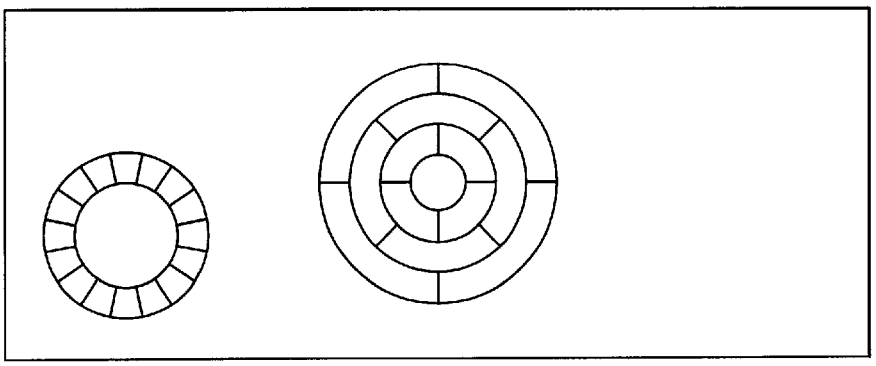
FIGS. 5A–D illustrate operation of a trigger message in the context of the example illustrated in FIGS. 4A–I.
Figure 5A:
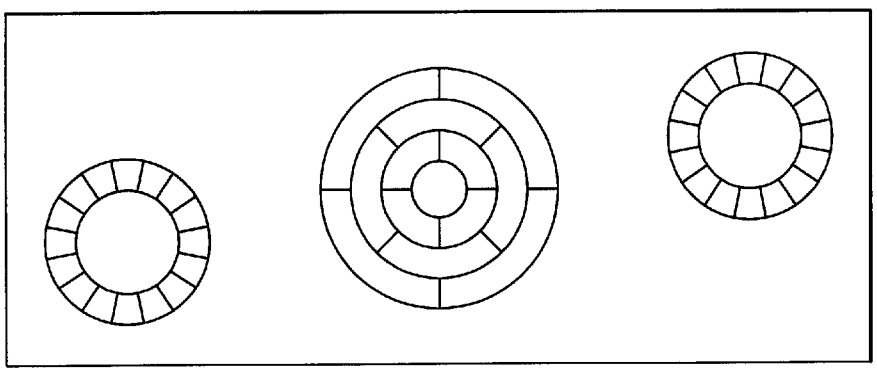
Figure 5A:
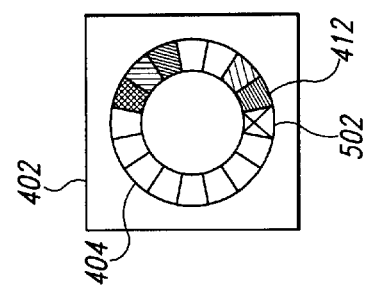
Figure 5B:
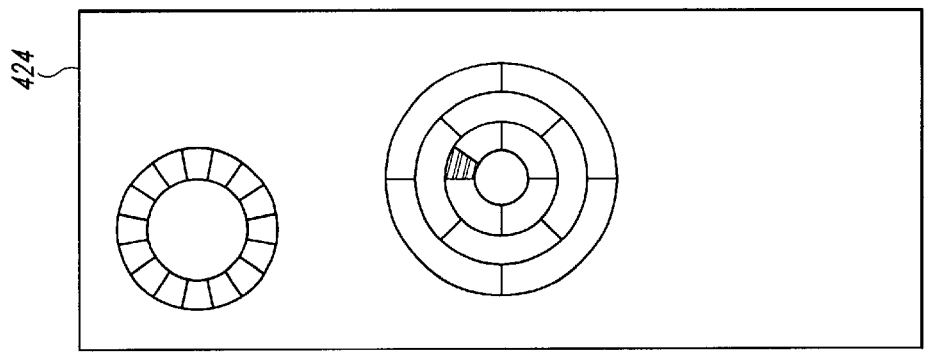
Figure 5B:
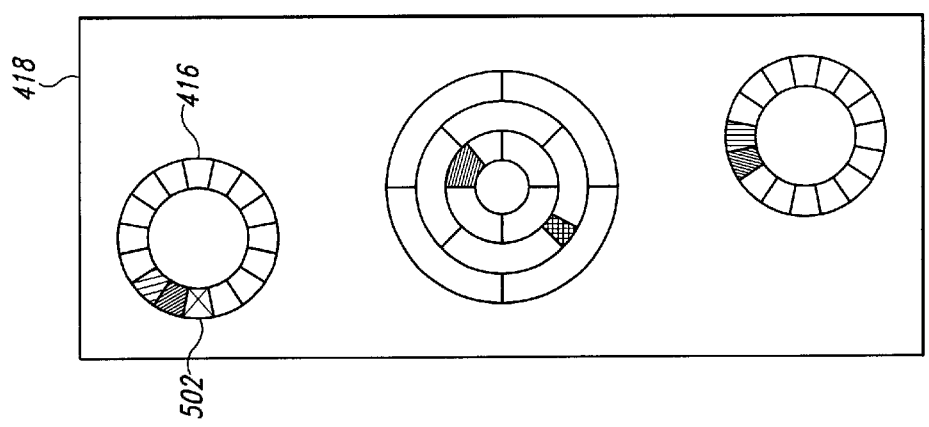
Figure 5B:
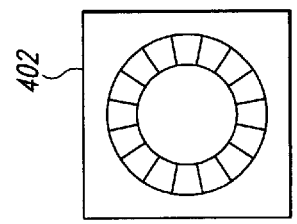

FIGS. 5A–D illustrate operation of a trigger message in the context of the example illustrated in FIGS. 4A–I. FIG. 5A corresponds to FIG. 4A, with the exception that a trigger I/O request 502 is inserted following WRITE request 412 in the input queue 404 of the host computer 402. The host computer inserts the trigger I/O request at a point in the I/O request stream at which, if all previous queued I/O requests are successfully executed, and no subsequently queued I/O requests are executed, the primary LUN will be in a logically consistent state with respect to transactions generated by host computer 402. FIG. 5B corresponds to FIG. 4F, and shows the trigger I/O request 502 having been successfully transmitted to the first disk array 418 and placed in the input queue 416 as a special TRIGGER message in correct sequential order with respect to the WRITE requests queued to the input queue. Thus, the controller of the disk array 418 interprets the I/O request directed to the special LUN or volume, or to the primary LUN via a special path. as a trigger request and places a special TRIGGER request into the input queue.

Note that the trigger-request mechanism depends on faithful sequencing of I/O requests within the input queues of the first disk array 418 and the second disk array 428. As discussed in a previously filed application, U.S. application Ser. No. 09/837,311, faithful sequencing of I/O requests within local and remote disk arrays can be accomplished using universal sequence number generation components within the disk arrays. Details for sequencing of I/O requests within disk arrays can be found in that application.

Figure 5C:
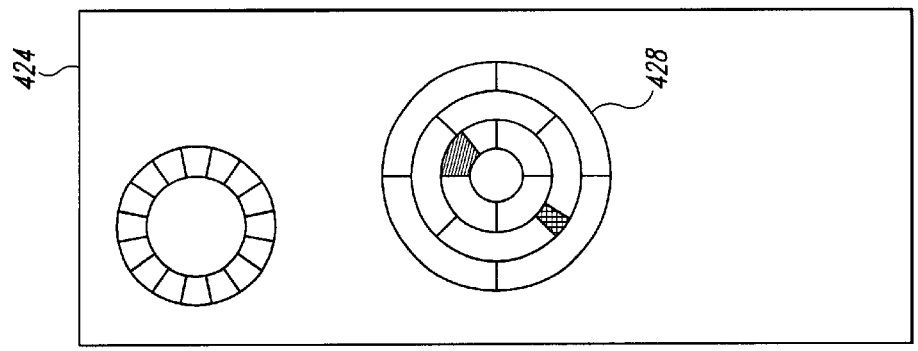
Figure 5C:
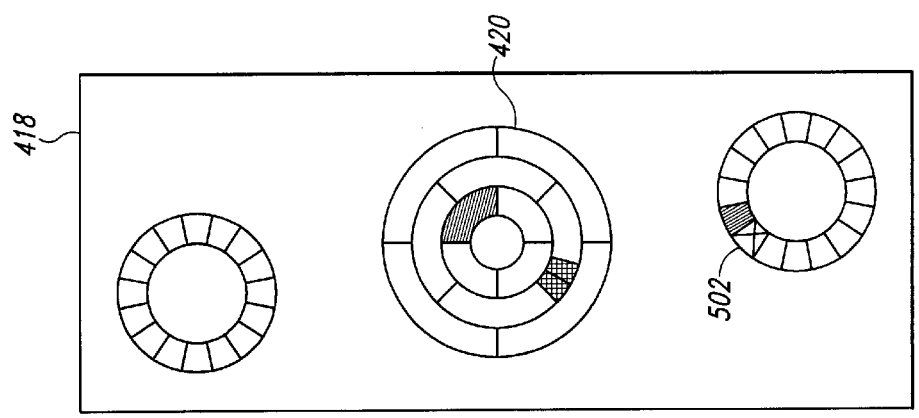
Figure 5C:
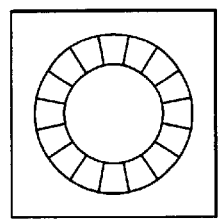
Figure 5D:
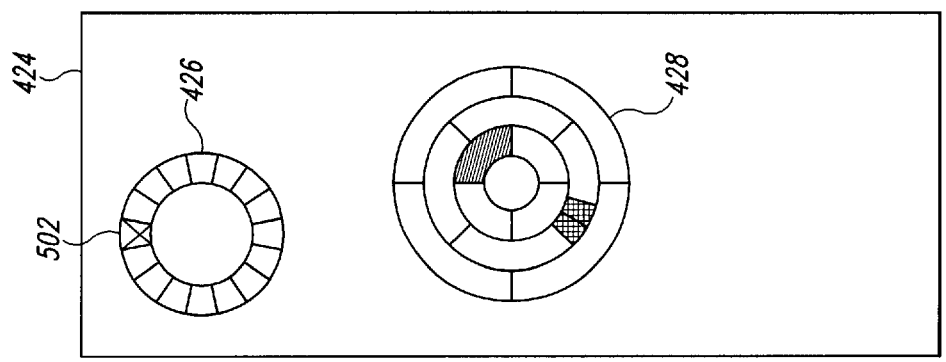
Figure 5D:
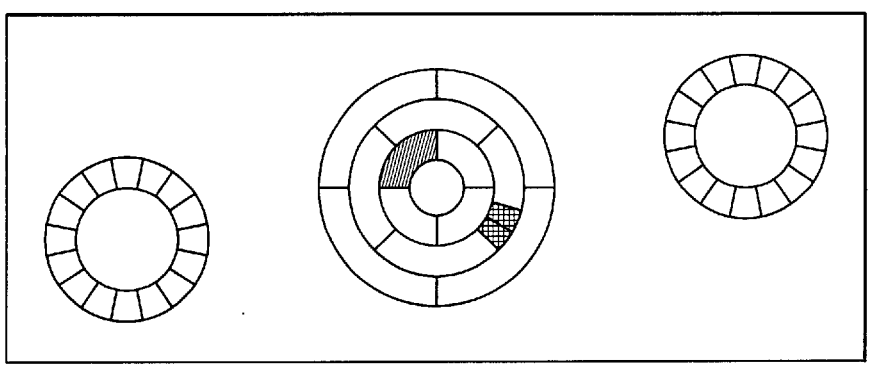
Figure 5D:
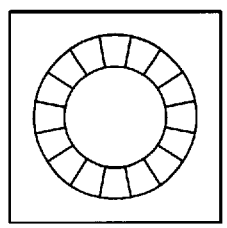

The presence of the trigger message 502 in input queue 416 indicates to the disk array controller that, when the trigger message is dequeued from the input queue, the primary LUN is in a logically consistent state, at least with respect to I/O requests generated by host computer 402. FIG. 5C corresponds to FIG. 4G. The trigger message 502 has been processed by the first disk array 418 and is queued for transmission to the second disk array 424. At the point in time shown in FIG. 5C, the controller of the first disk array 418 may undertake steps to prepare for splitting of the mirror pair comprising primary LUN 420 and backup LUN 428. For example, the controller of the first disk array 418 may temporarily discontinue processing WRITE requests directed to the primary LUN until the mirror split has occurred. FIG. 5D corresponds to FIG. 4I in which the primary LUN and backup LUN are both logically consistent, and the data states of the primary LUN and backup LUN are consistent, as well. The trigger message 502 will be next dequeued from input queue 426 of the second disk array 424. Upon dequeuing the trigger message, the controller of the second disk array 424 will know that the backup LUN 428 is in a logically consistent state, and can be disabled or deactivated in order to generate an archival backup copy. Should execution of a WRITE request fail, or other error conditions occur, during the time interval illustrated in FIGS. 4C–4G, then failed WRITES will need to be repeated and completed prior to considering the backup LUN 428 to be in a logically consistent or even data consistent state.

Figure 6:
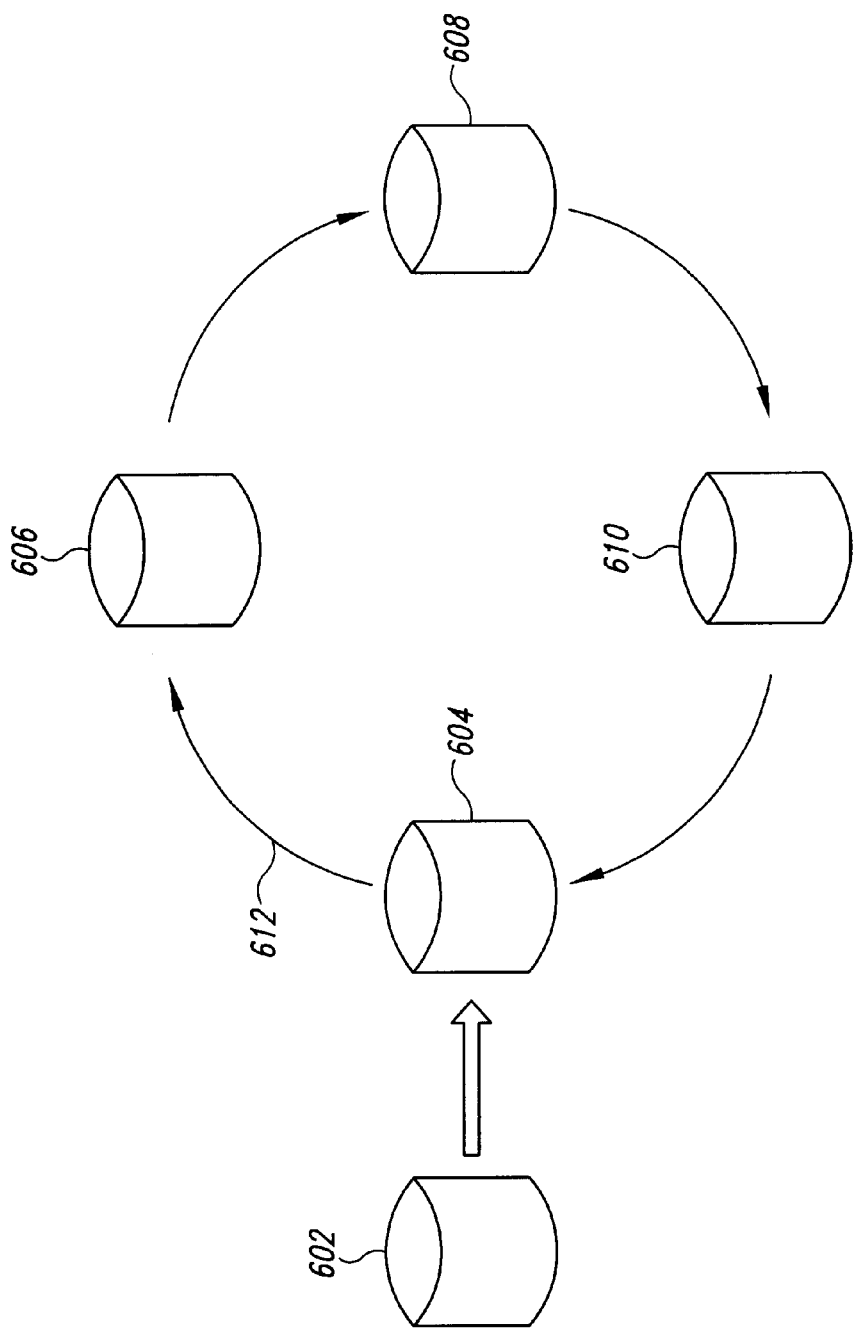
In FIG. 6 illustrates a pool of backup LUNs employed for generating backups at regular intervals.

The trigger-message mechanism allows the controller of the data storage device to recognize logically consistent points within an I/O request stream. However, for effective use of data-storage-device mirroring for backup copy generation, a second, automated technique for generating backup copies at regular intervals is needed. FIGS. 6–10 illustrate this second technique. In FIG. 6, a primary LUN 602 is paired with a currently active backup LUN 604 to form a mirrored LUN pair. The locations of the primary LUN and backup LUN are not important for this example, and are thus not specified in FIG. 6. Backup LUN 604 is part of a pool of backup LUNs that also includes inactive backup LUNs 606, 608, and 610. The pool of backup LUNs is organized as a circularly linked list of backup LUNs. This circularly linked list can be thought of as rotating, over time, in a forward direction. In FIG. 6, the forward direction is indicated by arrows, such as arrow 612. The inactive backup LUNs 606, 608, and 610 represent logically consistent backup copies taken at times increasingly distant in the past from the current time. For example, in FIG. 6, there are three inactive backup LUNs that may represent backups generated one hour previous to the time point shown in FIG. 6, in the case of inactive backup LUN 606, two hours previous to the current time, in the case of inactive backup LUN 608, and three hours previous to the current time, in the case of inactive backup LUN 610. At the next mirror split time, currently active backup LUN 604 will be disabled in a logically consistent state as determined by the presence of a trigger message, and will become the most recent backup copy, and inactive backup LUN 610 will be activated to become the currently active backup LUN via synchronizing by incorporating data added or updated to the primary LUN while backup LUN 610 was inactive.

Figure 7:
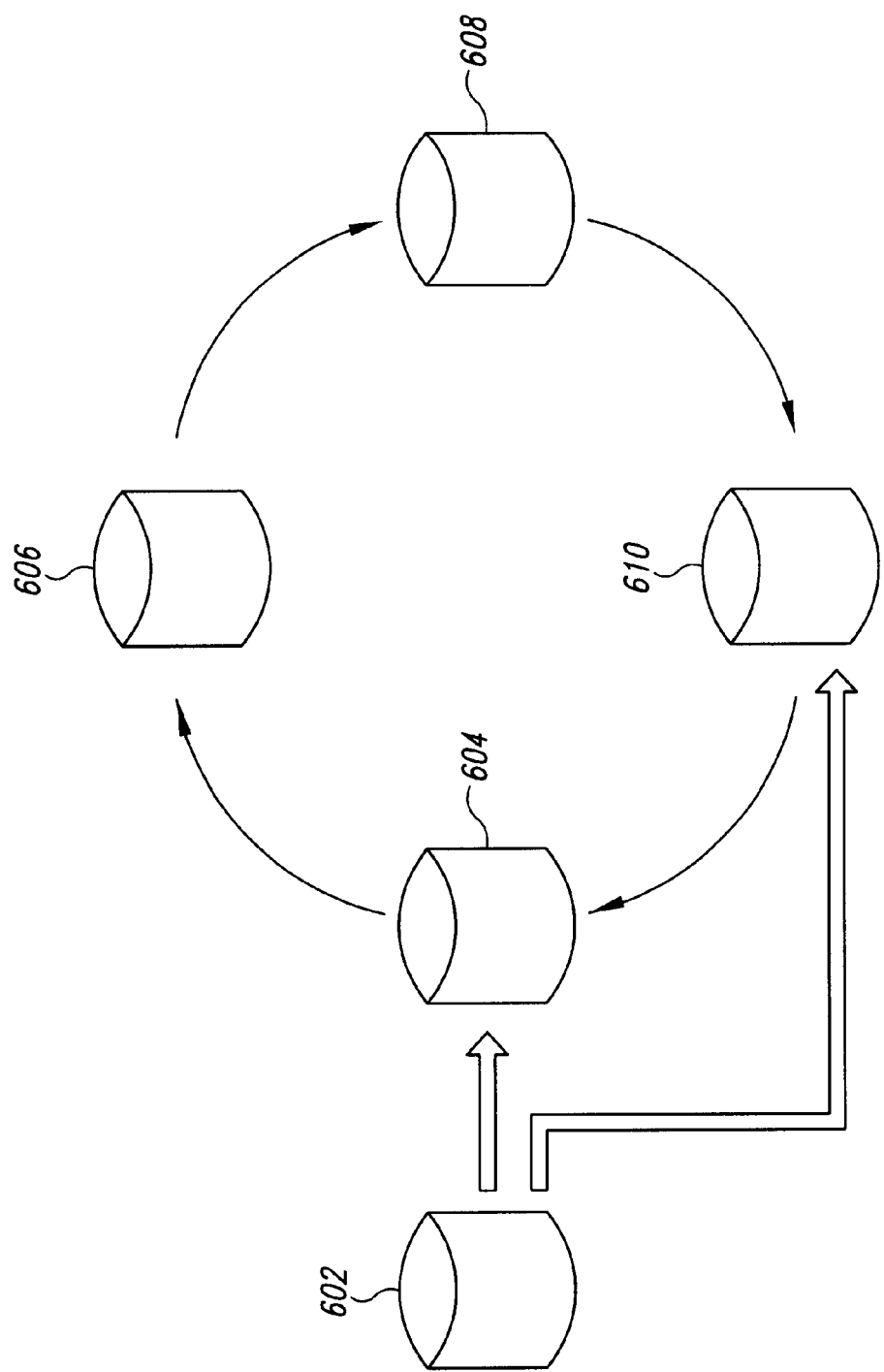
FIG. 7 illustrates an enhanced backup-LUN-pool technique that decreases the synchronization overhead for newly activated backup LUNs.

Although the circularly-linked pool of backup LUNs, illustrated in FIG. 6, automatically managed by the controller of the data storage device, provides for regular backup copy generation, the activation of an inactive backup LUN following a mirror split can involve a rather lengthy period of time during which the newly activated backup LUN must be synchronized with the primary LUN. Synchronization involves detecting differences in the data state of the primary LUN with respect to that of the newly activated backup LUN, and executing WRITE requests on the newly activated backup LUN in order to bring the backup LUN to a data state consistent with that of the primary LUN. In order to avoid a lengthy synchronization period, mirror WRITE requests can be executed on the currently active backup LUN as well as on the backup LUN that will next become the currently active backup LUN. FIG. 7 illustrates this enhanced backup-LUN-pool technique that decreases synchronization overheads for newly activated backup LUNs. As shown in FIG. 7, after an initial synchronization operating, new mirror WRITES corresponding to WRITES executed on the primary LUN 602 are executed both on the currently active backup LUN 604 and on backup LUN 610, which will next become the currently active backup LUN. Thus, during activation of currently inactive backup LUN 610, only those WRITE requests executed at the time that inactive backup LUNs 606 and 608 were previously active need be repeated in order to synchronize backup LUN 610 with primary LUN 602.

Figure 8:
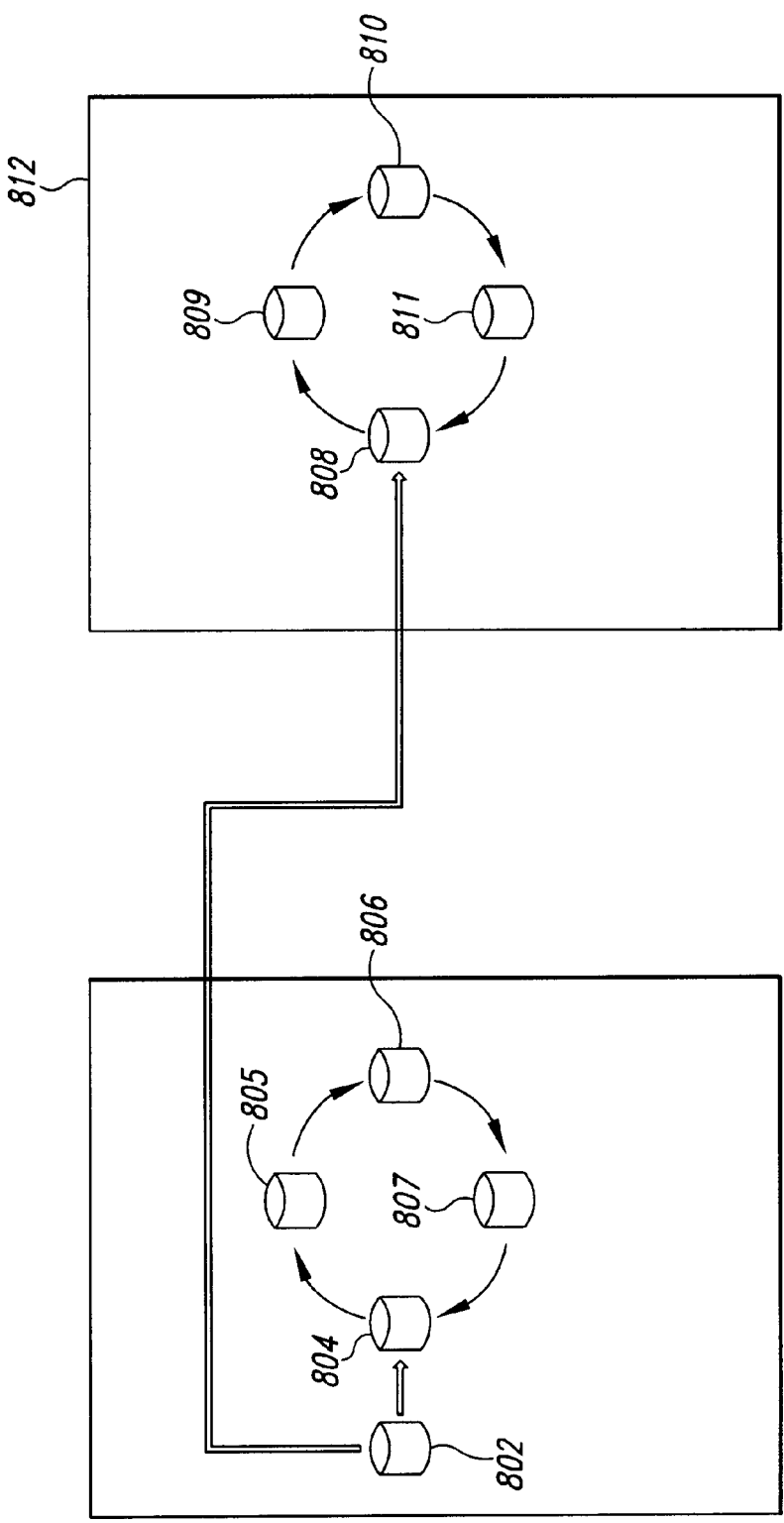
FIG. 8 illustrates a primary LUN mirrored to a local circularly-linked pool of backup LUNs.
Figure 9:
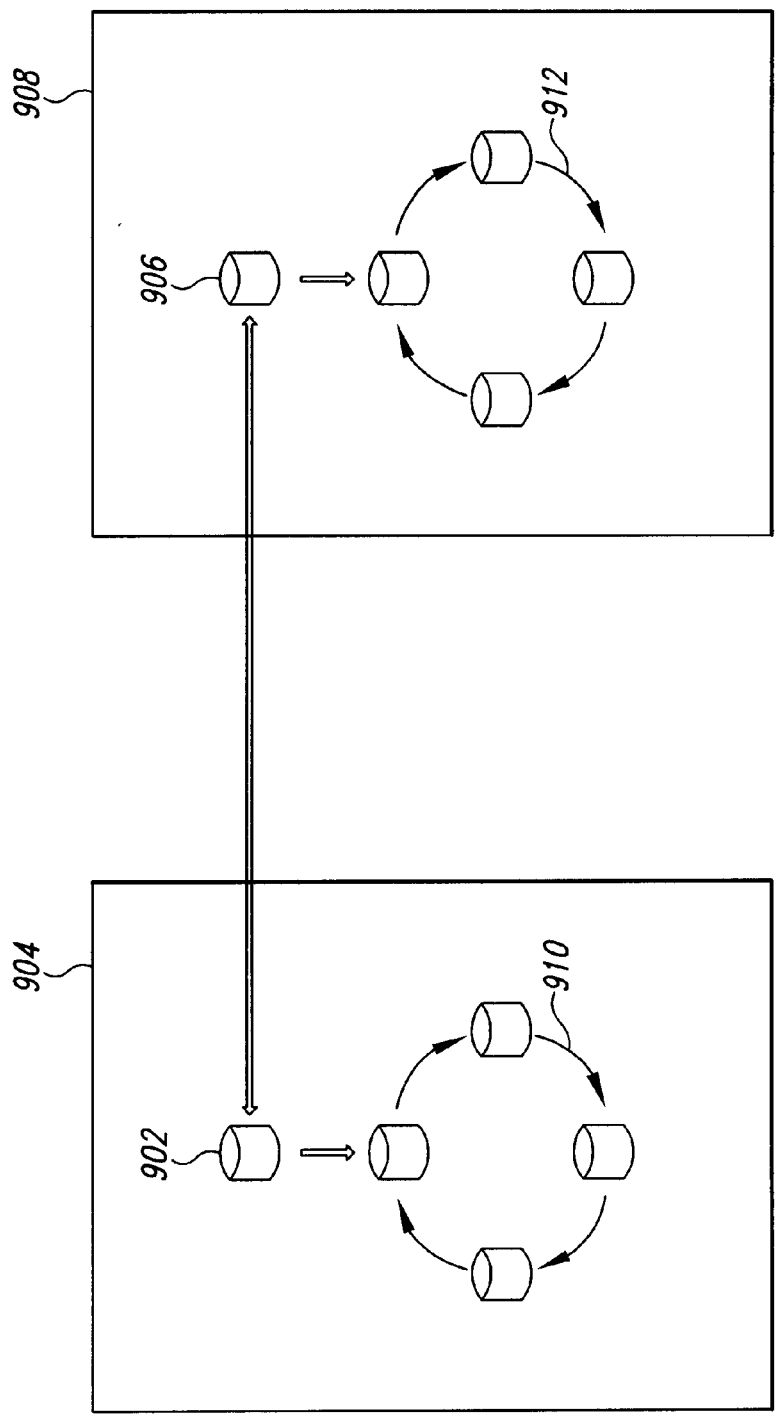
FIG. 9 illustrates a primary LUN within a first data storage device mirrored to a remote primary backup LUN in a remote data storage device 908.
Figure 10:
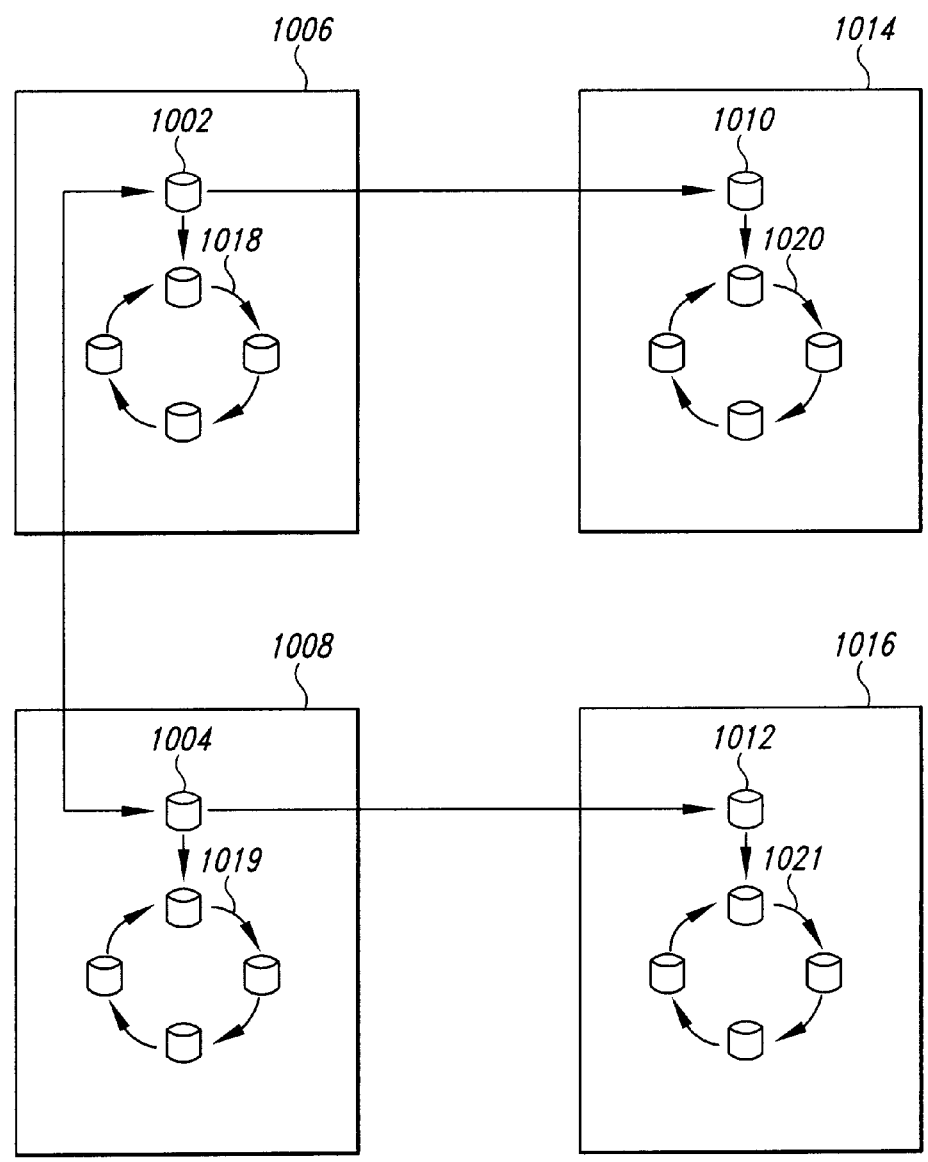
FIG. 10 shows an N-by-N data-storage-device configuration employing pools of circularly-linked backup LUNs.

The pool-of-circularly-linked-backup-LUNs technique may be employed for local mirroring as well as for remote mirroring. In FIG. 8, a primary LUN 802 is mirrored to a local, circularly linked pool of backup LUNs 804–807. In addition, the primary LUN 802 is mirrored to a circularly linked pool of backup LUNs 808–811 within a remote data storage device 812. Alternatively, a primary LUN may be mirrored to a primary backup LUN, and both the primary LUN and primary backup LUN may be locally mirrored to a circularly-linked pool of backup LUNs. FIG. 9 shows a primary LUN 902 within a first data storage device 904 mirrored to a remote primary backup LUN 906 in a remote data storage device 908. Both the primary LUN 902 and the primary backup LUN 906 are additionally mirrored to pools of circularly-linked backup LUNs 910 and 912, respectively. In certain cases, a data protection group, or multiple-LUN entity, may be distributed across several local data storage devices and mirrored to one or more remote data storage devices. Such N×M configurations are described in U.S. application Ser. No. 09/895,474 in detail. FIG. 10 shows an N-by-N configuration employing pools of circularly-linked backup LUNs. In FIG. 10, a distributed primary LUN 1002 and 1004 resides in local data storage devices 1006 and 1008, respectively. The distributed primary LUN is mirrored to a distributed backup LUN 1010 and 1012 residing in remote data storage devices 1014 and 1016, respectively.

Each of the primary and primary backup LUNs 1002, 1004, 1010, and 1012 are additionally mirrored to pools of circularly-linked backup LUNs 1018–1021.

The following is an abstract, C++-like model for the techniques of the present invention. This pseudocode model is not intended to show even a small fraction of the details of a data storage device controller, but is instead intended to illustrate the trigger message and pool-of-circularly-linked-backup-LUNs techniques in an abstract model example.

First, the pseudocode example includes an enumeration and several class declarations:

```
1 enum requestType {TRIGGER, WRITE, READ};
2 class IORequest
3 {
4   public:
5       requestType getType( );
6 };
7 class diskOp
8 {
9   public:
10      requestType getType( );
11 };
12 class disk
13 {
14  public:
15      void executeOperation(diskOp* op);
16 };
```

The enumeration "requestType," declared above on line 1, includes three types of I/O requests, including a TRIGGER request type, a WRITE request type, and a READ request type. The class "IORequest," declared above on lines 2–6, represents a generalized I/O request, and includes a single member function "getType," declared on line 5, that returns an indication of the type of I/O request, where the type is one of the values of the enumeration "requestType." The class "diskOp," declared above on lines 7–11, represents a disk operation that can be directed towards a particular data storage device, such as a disk drive. The class "disk," declared above on lines 12–16, represents a data storage device interface, such as a disk interface, and includes the member function "executeOperation," declared on line 15, which executes a disk operation furnished by reference in the calling argument "op."

The class "LUN," provided below, represents control functionality associated with a particular LUN within a data storage device, and a generalized LUN interface:

```
1 class LUN
2 {
3   private:
4       disk dk;
5       bool rotatingMirrorGroup;
6       LUN* remote;
7       LUN* mirrorHead;
8       LUN* mirrorTail;
9       LUN* next;
10      LUN* previous;
11      void synchronize(LUN* lptr);
12
13  public:
14      void executeOperation(diskOp* op);
15      LUN* getNext( ) {return next;};
16      LUN* getPrevious( ) {return previous;};
17      void setNext(LUN* n) {next = n;};
18      void setPrevious(LUN* p) {previous = p;};
19 };
```

The class "LUN" includes the following data members: (1) "dk," declared above on line 4, the disk drive to which the LUN is mapped within a data storage device; (2) "rotatingMirrorGroup," declared above on line 5, a Boolean value indicating whether or not the LUN is associated with a pool of circularly-linked backup LUNs, as illustrated in FIG. 6; (3) "remote," declared above on line 6, a pointer to a primary backup LUN, if the LUN is mirrored to a primary backup LUN; (4) "mirrorHead," declared above on line 7, a reference to the currently active backup LUN in an associated pool of backup LUNs; (5) "mirrorTail," declared above on line 8, a pointer to the least recently active backup LUN in an associated pool of circularly-linked backup LUNs; (6) "next," declared above on line 9, a pointer to the next LUN in a circularly-linked list of LUNs; and (7) "previous," declared above on line 10, a pointer to the previous LUN in a circularly-linked list of LUNs. The class "LUN" includes a single private member function "synchronize," declared on line 11, which synchronizes the current LUN and a LUN pointed to by the reference argument "lptr." An implementation for this member function is not provided, as it is outside the scope of the present discussion. Implementations are provided only as needed to illustrate the techniques of the present invention. The class "LUN" includes the following public member functions: (1) "executeOperation," a member function, declared above on line 14, that carries out a disk operation directed to the LUN; (2) "getNext," a member function, declared above on line 15, that provides the next LUN in a circularly-linked list of LUNs including the current LUN; (3) "getPrevious," declared above on line 16, a member function that returns a pointer to the previous LUN in a circularly-linked list of LUNs including the current LUN; and (4) member functions "setNext" and "setPrevious," declared above on lines 17–18, that allow data members "next" and "previous" to be set to values provided as arguments.

The class "LUNs," provided below, is a class that manages the entire set of LUNs provided by a data storage device, and the class "inputQueue," also provided below, corresponds to an input queue, such as input queue 416 in disk array 418 of FIGS. 4A–I:

```
1 class LUNs
2 {
3   public:
4       diskOp* translateRequest(LUN** lptr, IORequest* r);
5
6 };
7 class inputQueue
8 {
9   public:
10      void inQueue(IORequest* r);
11      IORequest* outQueue( );
12      int numQueued( );
13      activateCallback(void (*a) (inputQueue* qu));
14      inputQueue( );
15 };
```

The class "LUNs" is shown only with a single member function "translateRequest" that translates an I/O request supplied as argument "r" into a returned disk operation that can be directed towards a LUN referenced by argument "lptr." The member functions of the class "inputQueue" allow for queuing and dequeuing I/O requests to the input queue, for determining the number of I/O requests queued to the input queue, and for activating a callback function associated with the input queue so that, when an I/O request is queued to the input queue, the callback function is called. It is assumed that only a single thread or process corresponding to the callback function can be activated at any given point in time, so that if the callback function is active when a next I/O request is queued to the queue, a second process or thread will not be spawned.

The class "controller," provided below, represents I/O request processing by the controller of the data storage device:

```
1  class controller
2  {
3    private:
4        inputQueue* queue( );
5        LUNs luns;
6
7
8    public:
9        void handle(inputQueue* qu);
10       controller( );
11 };
```

The class "controller" includes the following data members: (1) "queue," declared above on line 4, an input queue such as input queue 416 of disk array 418 in FIG. 4A; and (2) "luns," declared above on line 5, the LUN management functionality of the controller. The class controller includes the following public member functions: (1) "handle," declared above on line 9, a member function that serves as the callback function for an input queue serviced by the controller and that handles all I/O requests directed to the controller; and (2) "controller," a constructor for the class "controller." An implementation of the constructor is not shown, but includes initialization of the input queue to activate member function "handle" as the callback function.

An implementation of the member function "executeOperation" of the class "LUN" is provided below:

```
1  void LUN::executeOperation(diskOp* op)
2  {
3
4    switch (op->getType( ))
5    {
6      case TRIGGER:
7        if (rotatingMirrorGroup)
8        {
9          mirrorHead = mirrorTail;
10         mirrorTail = mirrorTail->getPrevious( );
11         synchronize(mirrorHead);
12       }
13       if (remote != NULL) remote->executeOperation(op);
14       break;
15     case WRITE:
16       dk.executeOperation(op);
17       if (rotatingMirrorGroup)
18       {
19         mirrorHead->executeOperation(op);
20         mirrorTail->executeOperation(op);
21       }
22       if (remote != NULL) remote->executeOperation(op);
23       break;
24     case READ:
25       dk.executeOperation(op);
26       break;
27   }
28 }
```

The member function "executeOperation" receives a disk operation referenced by the argument "op" on line 1. On line 4, executeOperation determines the type of the operation. In the case that the operation is a TRIGGER message, as described above with reference to FIGS. 5A–D, executeOperation determines, on line 7, whether or not the LUN is associated with a rotating mirror group. If so, then execute-Operation rotates the circularly linked list of backup LUNs by one, on lines 9 and 10, and synchronizes the newly activated backup LUN on line 11. If the LUN is associated with a remote primary backup LUN, as detected on line 13, then the TRIGGER message is forwarded to that remote primary backup LUN on line 13. In the case of a WRITE disk operation, executeOperation executes the WRITE on the local LUN on line 16, forwards the WRITE to an associated pool of circularly-linked backup LUNs on lines 17–21, and forwards the WRITE to a remote primary backup LUN on line 22, if the LUN is associated with a remote primary backup LUN. In the case of a READ operation, executeOperation simply executes the READ on the local data storage device on line 25.

Finally, an implementation of the member function "handle" for the class "controller" is provided below:

```
1  void controller::handle(inputQueue* qu)
2  {
3    IORequest* r;
4    diskOp* d;
5    LUN* ptr;
6
7    while (qu->numQueued( ) > 0)
8    {
9      r = qu->outQueue( );
10     d = luns.translateRequest(&ptr, r);
11     ptr->executeOperation(d);
12   }
13 }
```

The functionality for the controller related to the present invention in the current pseudocode model is straightforward. While there are I/O requests queued to the input queue, as detected on line 7, the controller dequeues the next I/O request on line 9, translates the dequeued I/O request into a disk operation on line 10, and directs the disk operation to the appropriate LUN on line 11.

Although the present invention has been described in terms of a particular embodiment, it is not intended that the invention be limited to this embodiment. Modifications within the spirit of the invention will be apparent to those skilled in the art. For example, both management of a pool of circularly linked backup LUNs and processing of TRIGGER I/O requests and internal TRIGGER messages can be implemented via an almost unlimited number of different hardware, firmware, and software implementations, or via hybrid combinations of hardware, firmware, and software. Any number of backup LUNs may included within a pool of backup LUNs, and the number and identify of the LUNs may be configured by configuration files or through data-storage-device administration tools. The time interval during a backup LUN is active may also be configurable. As discussed above, any of a variety of different out-of-band messaging techniques can be employed for the TRIGGER I/O request, including sending by an application program of an I/O request to a special LUN or volume, sending an I/O request by a speacial path to the primary LUN of a mirror LUM pair, sending a special TRIGGER I/O request recognized by the disk array controller, or by sending a message or signal over a separate communications medium. Many different backup LUN pool configurations and topologies are possibly, apart from those disclosed above. More complex strategies involving tiered hierarchies of backup LUNs, or topologies other than circularly linked lists, may be employed. While the discussed embodiments related to disk arrays, the techniques of the present invention are related to a wide range of data storage devices that offer data mirroring. Although the described embodiments and examples showed a single mirrored LUN pair, the techniques of the present invention are intended to applied, in parallel, for tens to hundreds of mirrored LUN pairs within one or more data storage devices.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents;

What is claimed is:

1. A method for backing up a primary logical unit within a data storage device, the primary logical unit and a backup logical unit together comprising a mirror-logical-unit pair, the backup logical unit an active member of a pool of backup logical units managed by a controller of the data storage device, the method comprising:

receiving a trigger I/O request by the data storage device;

inserting a TRIGGER message corresponding to the I/O request into a queue that contains a portion of a sequenced stream of I/O requests directed to the primary logical unit;

dequeing the TRIGGER message from the queue, and initiating a mirror split operation directed to the primary logical unit;

sending the TRIGGER message to the backup logical unit;

upon receiving the TRIGGER message by a controller handling the backup logical unit, deactivating the active backup logical unit, activating a least recently active backup logical unit within the pool of backup logical units, synchronizing the activated backup logical unit with the primary logical unit; and receiving and executing mirror I/O requests on the activated backup logical unit; and after completion of the mirror split operation, maintaining the backup logical unit as a backup copy of the primary logical unit.

2. A data storage device that provides efficient backup generation to an external program running on a host computer, the data storage device comprising:

an ordered pool of backup logical units, one of which is a currently active backup logical unit that mirrors a primary logical unit; and a controller that receives and recognizes a trigger MESSAGE directed to the active backup logical unit, queues the TRIGGER message in sequence with other received I/O requests, and that, upon dequeuing the TRIGGER message for execution, deactivates the currently active backup unit, synchronizes a least recently active inactive backup logical unit with the primary logical unit, and activates the least recently active inactive backup logical as the currently active backup logical unit.

3. The data storage device of claim 2 wherein the primary logical unit is contained within the data storage device.

4. The data storage device of claim 2 wherein the primary logical unit is contained within a remote data storage device.

5. The data storage device of claim 2 wherein the data storage device further includes a primary backup logical unit that mirrors the primary logical unit in addition to the ordered pool of backup logical units.

* * * * *